(12) United States Patent
Kayode et al.

(10) Patent No.: US 11,852,011 B2
(45) Date of Patent: Dec. 26, 2023

(54) APPLICATION OF FIELD SHUT-DOWN PRESSURE TRANSIENT TO DEFINE BOUNDARIES OF RESERVOIR HETEROGENEITIES

(71) Applicant: Saudi Arabian Oil Company, Dhahran (SA)

(72) Inventors: Babatope Kayode, Dhahran (SA); Nora Hamidaddin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 17/498,578

(22) Filed: Oct. 11, 2021

(65) Prior Publication Data
US 2023/0111079 A1    Apr. 13, 2023

(51) Int. Cl.
*E21B 47/06*    (2012.01)
*E21B 47/12*    (2012.01)
*G06T 17/00*    (2006.01)

(52) U.S. Cl.
CPC ............ *E21B 47/06* (2013.01); *E21B 47/138* (2020.05); *G06T 17/00* (2013.01); *E21B 2200/20* (2020.05); *E21B 2200/22* (2020.05)

(58) Field of Classification Search
CPC .... E21B 47/06; E21B 47/138; E21B 2200/20; E21B 2200/22; G06T 17/00
See application file for complete search history.

(56) References Cited

U.S. PATENT DOCUMENTS

| | | | |
|---|---|---|---|
| 8,793,112 B2 | 7/2014 | Levitan | |
| 9,151,868 B2 | 10/2015 | Levitan | |
| 2014/0257775 A1* | 9/2014 | Levitan | G01V 99/005 703/2 |
| 2019/0257196 A1* | 8/2019 | Kayode | E21B 47/00 |

OTHER PUBLICATIONS

Joshi, Deepti. Polygonal spatial clustering. The University of Nebraska-Lincoln, 2011. p. 13 (Year: 2011).*

(Continued)

*Primary Examiner* — Son T Le
*Assistant Examiner* — Brian Butler Geiss
(74) *Attorney, Agent, or Firm* — Fish & Richardson P.C.

(57) ABSTRACT

Systems and methods include a computer-implemented method for generating a detailed heterogeneities map of a main reservoir. Pressure data for multiple wells of a main reservoir is received during a simultaneous field shut-in of the multiple wells. A scaled rate of change of pressure for each well is determined using the pressure data for each well. Rates of change of pressure for the multiple wells are plotted using the scaled rates of change of pressure. Clusters of wells having rates of change of pressure within a threshold difference of other wells in a given cluster are determined based on the plotting. A detailed heterogeneities map of the main reservoir is generated based the clusters of wells. The heterogeneities map defines heterogeneous regions. Each region contains a set of wells assigned to the heterogeneous region based on the wells having similar rates of change of pressure.

20 Claims, 37 Drawing Sheets

(56) References Cited

OTHER PUBLICATIONS

Kayode et al., "Pressure Conditioned Modeling: Application of Time-Lapse Shut-in Pressure Data to Map Connected Reservoir Regions for Conditioning of 3-D Geomodel Property Distributions," SPE Kingdom of Saudi Arabia Annual Technical Symposium and Exhibition, Dammam, Saudi Arabia, Apr. 2018, 15 pages.

Liang et al., "A New Method for Production Data Analysis and Well Testing Using Superposition- Rate," SPE/AAPG/SEG Unconventional Resources Technology Conference, San Antonio, Texas, Aug. 2016, 25 pages.

Peres et al., "Rate Superposition for Generating Pressure Falloff Solutions," SPE Journal, Sep. 2006, 11(03):364-374, 11 pages.

\* cited by examiner

| Bo | Bw | visco cp | viscw cp | k md | poro | h ft | ct | Pi psia | tp hrs | q1 | q2 | q3 | q4 | q5 |
|---|---|---|---|---|---|---|---|---|---|---|---|---|---|---|
| 1.2 | 1 | 2 | 0.5 | 1000 | 0.3 | 150 | 0.0000437 | 5000 | 200 | 2500 | 5000 | 3000 | -10000 | 0 |

| r12 | r13 | r23 | r14 | r24 | r34 | r15 | r25 | r35 | r45 |
|---|---|---|---|---|---|---|---|---|---|
| 1400 | 2000 | 2500 | 1800 | 1350 | 1400 | 150 | 1600 | 1200 | 1000 |

```
For i = 1 To 100
  dt = 1

A_prod(1) = Ei(948 * poro * visc * ct * (rw) * (rw) / perm / (tp +dt)) - Ei(948 * poro * visc * ct * (rw) / perm / (dt))
  deltap_prod = -70.6 * fvf * visc * q(1) / perm / h * (A_prod(1))
  interference(12) = Ei(948 * poro * visc * ct * (r12) * (r12) / perm / (tp + dt)) - Ei(948 * poro * visc * ct * (r12) * (r12) / perm / (dt))
  deltap_prod = deltap_prod - 70.6 * fvf * visc * q(2) / perm / h * (interference(12))
  interference(13) = Ei(948 * poro * visc * ct * (r13) * (r13) / perm / (tp + dt)) - Ei(948 * poro * visc * ct * (r13) * (r13) / perm / (dt))
  deltap_prod = deltap_prod - 70.6 * fvf * visc * q(3) / perm / h * (interference(13))
  interference(14) = Ei(948 * poro * visc * ct * (r14) * (r14) / perm / (tp + dt)) - Ei(948 * poro * visc * ct * (r14) * (r14) / perm / (dt))
  deltap_prod = deltap_prod - 70.6 * 1 * viscw * q(4) / perm / h * (interference(14))
  Pr(1) = Pinit + deltap_prod A_prod(2) = Ei(948 * poro * visc * ct * (rw) * (rw) / perm / (tp +dt)) - Ei(948 * poro * visc * ct * (rw) / perm / (dt))
  deltap_prod = -70.6 * fvf * visc * q(2) / perm / h * (A_prod(2))
  interference(21) = Ei(948 * poro * visc * ct * (r12) * (r12) / perm / (tp + dt)) - Ei(948 * poro * visc * ct * (r12) * (r12) / perm / (dt))
  deltap_prod = deltap_prod - 70.6 * fvf * visc * q(1) / perm / h * (interference(21))
  interference(23) = Ei(948 * poro * visc * ct * (r23) * (r23) / perm / (tp + dt)) - Ei(948 * poro * visc * ct * (r23) * (r23) / perm / (dt))
  deltap_prod = deltap_prod - 70.6 * fvf * visc * q(3) / perm / h * (interference(23))
  interference(24) = Ei(948 * poro * visc * ct * (r24) * (r24) / perm / (tp + dt)) - Ei(948 * poro * visc * ct * (r24) * (r24) / perm / (dt))
  deltap_prod = deltap_prod - 70.6 * 1 * viscw * q(4) / perm / h * (interference(24))
  Pr(2) = Pinit + deltap_prod
```

TO FIG. 3B

FROM FIG. 3A

```
A_prod(3) = Ei(948 * poro * visc * ct * (rw) * (rw) / perm / (tp +dt)) - Ei(948 * poro * visc * ct * (rw) / perm / (dt))
deltap_prod = -70.6 * fvf * visc * q(3) / perm / h * (A_prod(3))
interference(31) = Ei(948 * poro * visc * ct * (r13) * (r13) / perm / (tp + dt)) - Ei(948 * poro * visc * ct * (r13) / perm / (dt))
deltap_prod = deltap_prod - 70.6 * fvf * visc * q(1) / perm / h * (interference(31))
interference(32) = Ei(948 * poro * visc * ct * (r23) * (r23) / perm / (tp + dt)) - Ei(948 * poro * visc * ct * (r23) / perm / (dt))
deltap_prod = deltap_prod - 70.6 * fvf * visc * q(2) / perm / h * (interference(32))

interference(34) = Ei(948 * poro * visc * ct * (r34) * (r34) / perm / (tp + dt)) - Ei(948 * poro * visc * ct * (r34) / perm / (dt))
deltap_prod = deltap_prod - 70.6 * 1 * viscw * q(4) / perm / h * (interference(34))
Pr(3) = Pinit + deltap_prod A_prod(4) = Ei(948 * poro * viscw * ct * (rw) * (rw) / perm / (tp +dt)) - Ei(948 * poro * viscw * ct * (rw) / perm / (dt))
deltap_prod = -70.6 * 1 * viscw * q(4) / perm / h * (A_prod(4))
interference(41) = Ei(948 * poro * visc * ct * (r14) * (r14) / perm / (tp + dt)) - Ei(948 * poro * visc * ct * (r14) / perm / (dt))
deltap_prod = deltap_prod - 70.6 * fvf * visc * q(1) / perm / h * (interference(41))
interference(42) = Ei(948 * poro * visc * ct * (r24) * (r24) / perm / (tp + dt)) - Ei(948 * poro * visc * ct * (r24) / perm / (dt))
deltap_prod = deltap_prod - 70.6 * fvf * visc * q(2) / perm / h * (interference(42))
interference(43) = Ei(948 * poro * visc * ct * (r34) * (r34) / perm / (tp + dt)) - Ei(948 * poro * visc * ct * (r34) / perm / (dt))
deltap_prod = deltap_prod - 70.6 * fvf * visc * q(3) / perm / h * (interference(43))
Pr(4) = Pinit + deltap_prod '==superposition effect at the observation well location
deltap_prod = 0
interference(15) = Ei(948 * poro * visc * ct * (r15) * (r15) / perm / (tp + dt)) - Ei(948 * poro * visc * ct * (r15) / perm / (dt))
deltap_prod = deltap_prod -70.6 * fvf * visc * q(1) / perm / h * (interference(15))
interference(25) = Ei(948 * poro * visc * ct * (r25) * (r25) / perm / (tp + dt)) - Ei(948 * poro * visc * ct * (r25) / perm / (dt))
deltap_prod = deltap_prod -70.6 * fvf * visc * q(2) / perm / h * (interference(25))
interference(35) = Ei(948 * poro * visc * ct * (r35) * (r35) / perm / (tp + dt)) - Ei(948 * poro * visc * ct * (r35) / perm / (dt))
deltap_prod = deltap_prod -70.6 * fvf * visc * q(3) / perm / h * (interference(35))
interference(45) = Ei(948 * poro * visc * ct * (r45) * (r45) / perm / (tp + dt)) - Ei(948 * poro * visc * ct * (r45) / perm / (dt))
deltap_prod = deltap_prod -70.6 * 1 * viscw * q(4) / perm / h * (interference(45))
Pr(5) = Pinit + deltap_prod
```

FIG. 3B

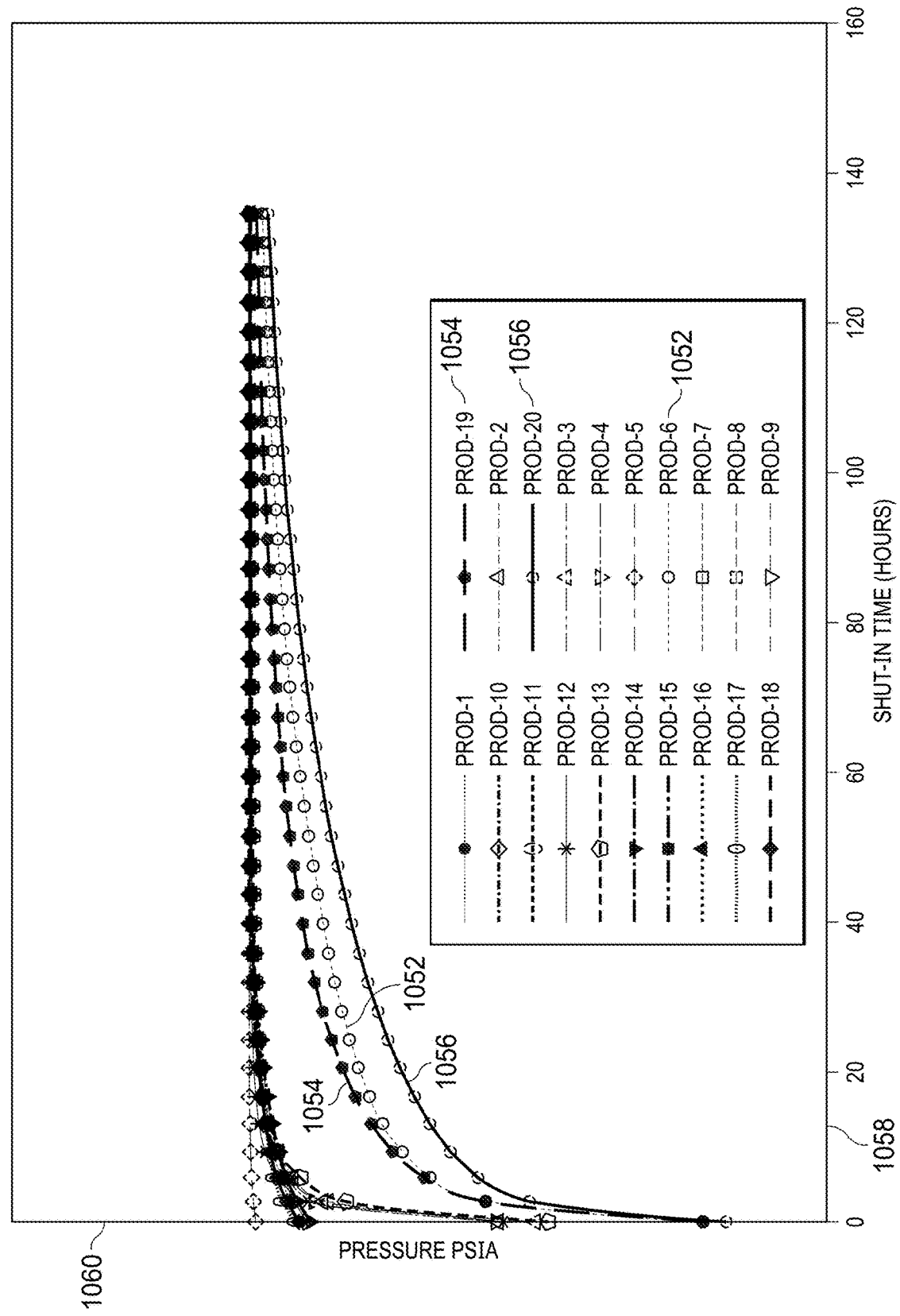

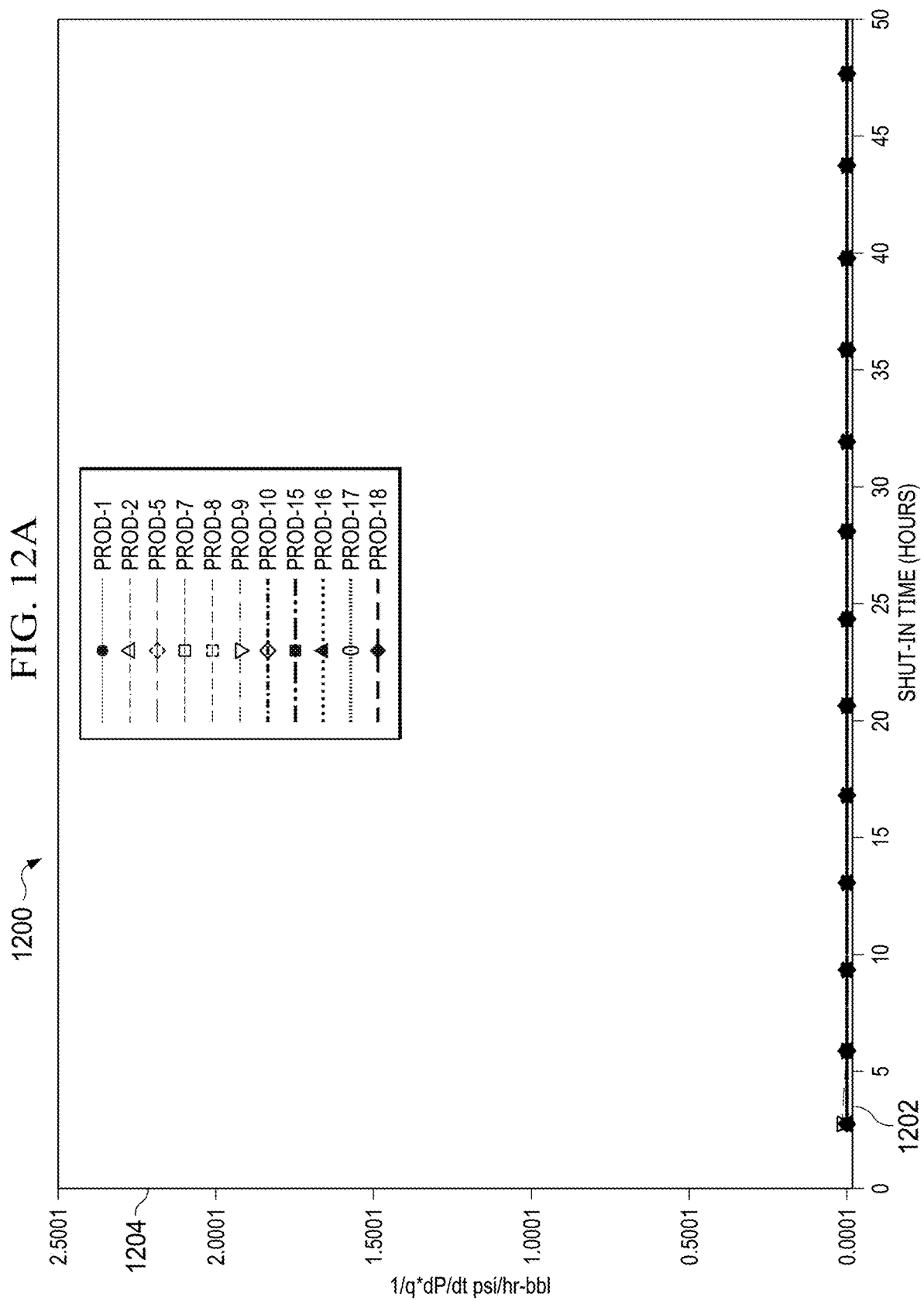

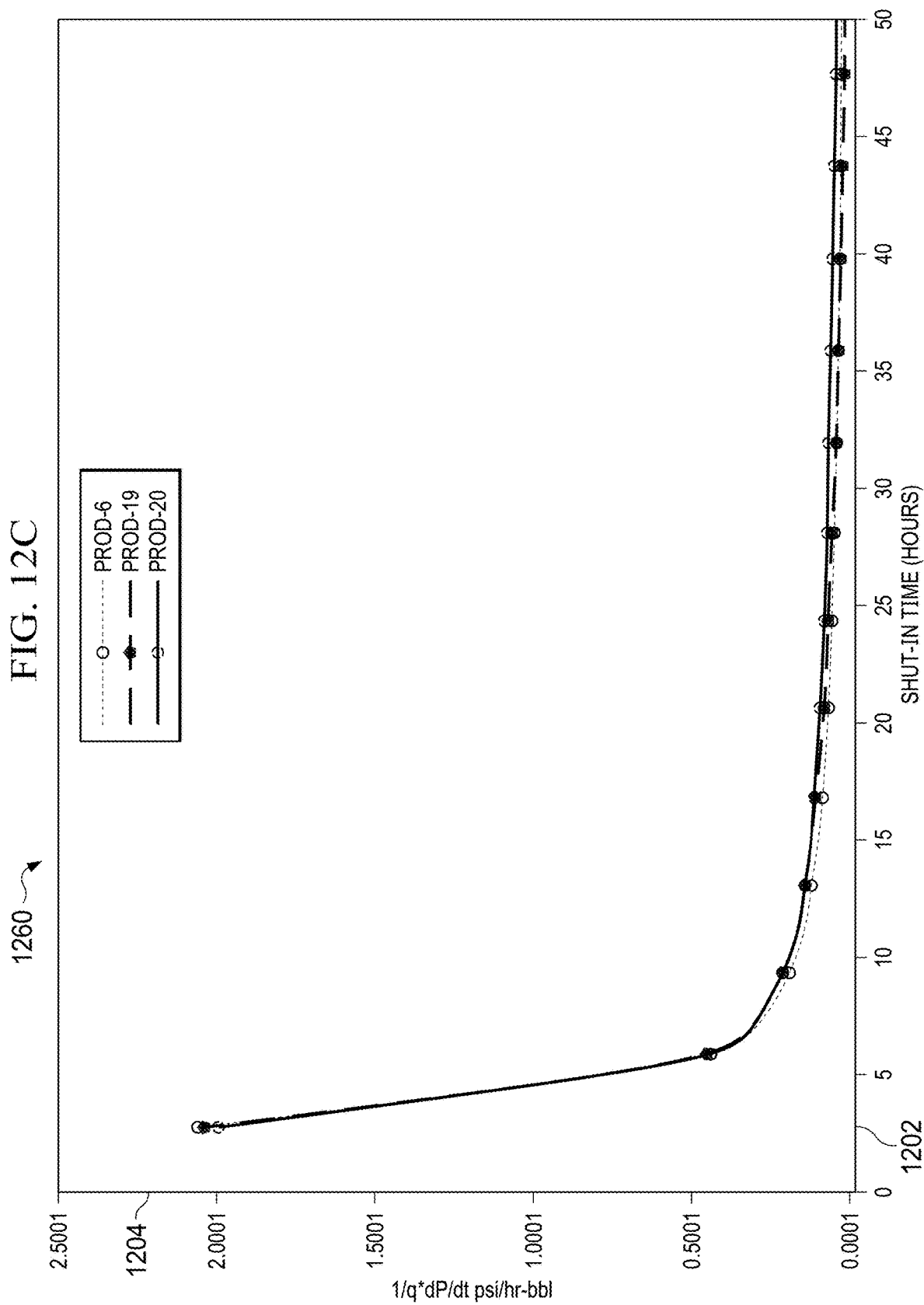

| Parameters | Region-1 | Region-2 | Region-3 |
|---|---|---|---|
| Min poro/perm | 0.05/0.1 | 0/0.1 | 0/0.1 |
| Max poro/perm | 0.2/2500 | 0.15/1000 | 0.1/300 |
| mean poro/perm | 0.15/1000 | 0.1/100 | 0.05/50 |
| SD poro/perm | 0.02/875 | 0.02/50 | 0.02/2 |

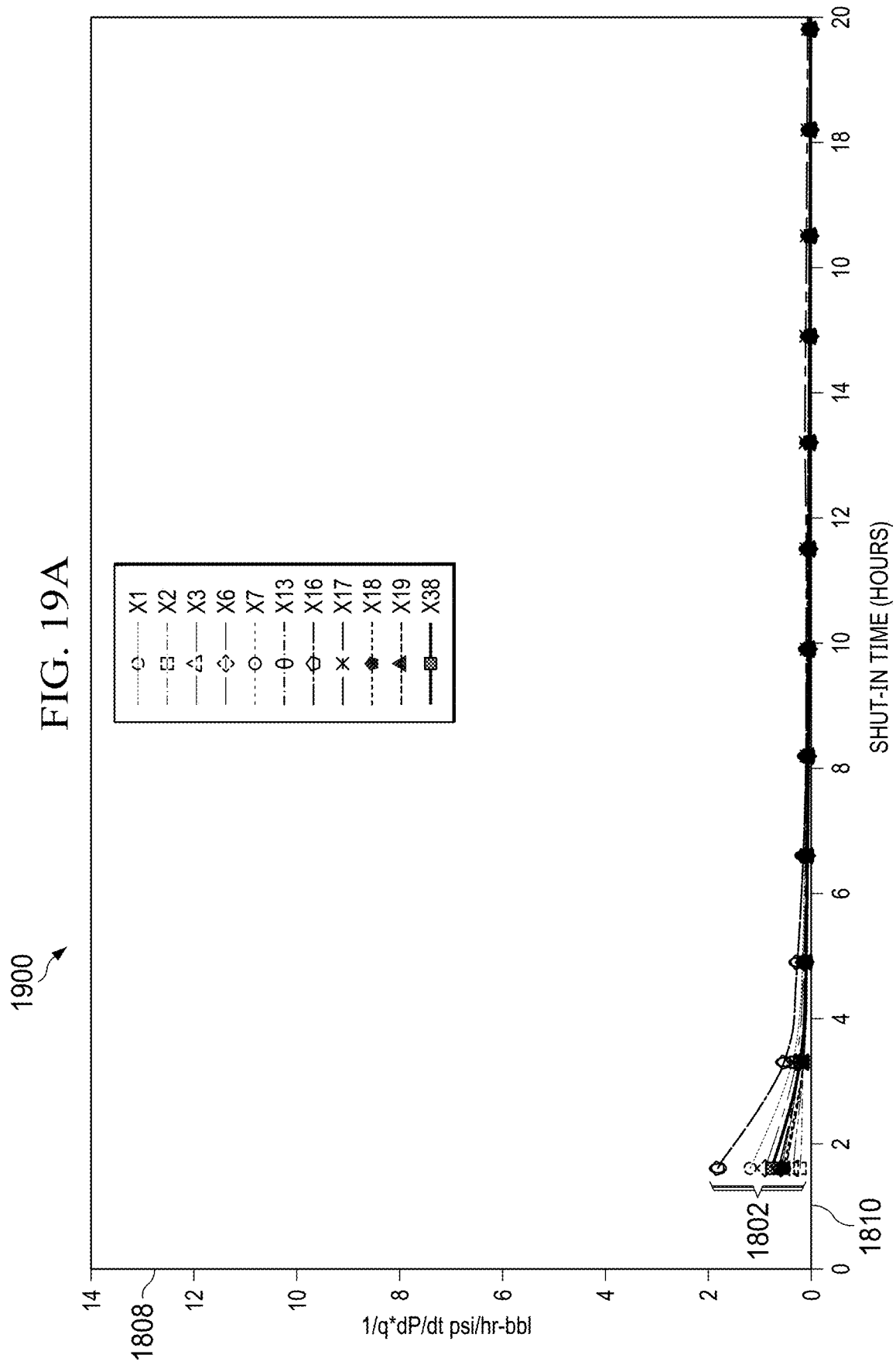

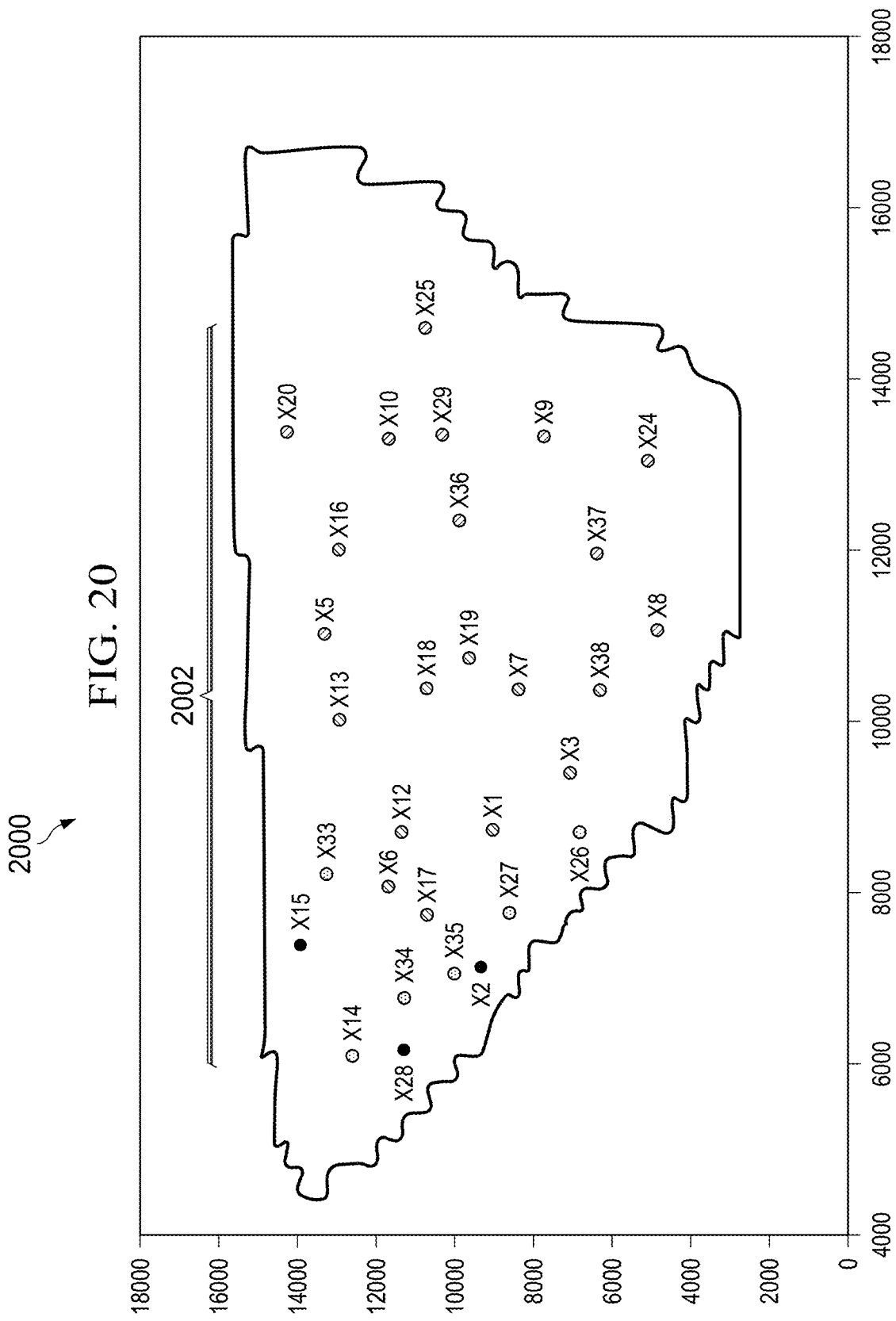

APPLICATION OF FIELD SHUT-DOWN PRESSURE TRANSIENT TO DEFINE BOUNDARIES OF RESERVOIR HETEROGENEITIES

TECHNICAL FIELD

The present disclosure applies to determining pressure changes in wells.

BACKGROUND

Determining reservoir heterogeneities in a well, such as in an oil well, can include an analysis of pressure changes over time, including pressure changes associated with small variations in fluid volume. In some well tests, a limited amount of fluid may be allowed to flow from a formation being tested, and the pressure at the formation can be monitored over time. The well can then be closed. The pressure can be monitored while the fluid within the formation equilibrates. The analysis of the pressure changes can provide information on the size and shape of the formation as well as the well's ability to produce fluids.

In conventional systems, depending on how long the wells are shut-in before recording the single-point pressure, some heterogeneities may be missed. In general, it can be challenging to know in advance what duration of shut-in time is necessary before recording single-point datum pressures in order to ensure that main reservoir heterogeneities are preserved in recorded pressure data. As an example, in conventional systems, for pressure data taken after five days of shut-in, some reservoir heterogeneities can become masked and unidentifiable. In everyday oil and gas field operations, recorded single-point pressures are not necessarily recorded at same duration of shut-in. Oil-field production shut-down can sometimes occur due to planned or unplanned reasons, requiring a simultaneous closure of all wells in the reservoir.

SUMMARY

The present disclosure describes techniques that can be used for receiving continuous pressure data during a simultaneous field shut-in of multiple wells of a main reservoir, and using the data to create a detailed heterogeneities map of the main reservoir. In some implementations, a computer-implemented method includes the following. Pressure data for multiple wells of a main reservoir is received by a heterogeneities mapping application during a simultaneous field shut-in of the multiple wells of the main reservoir. A scaled rate of change of pressure for each well of the multiple wells is determined by the heterogeneities mapping application using the pressure data for each well of the multiple wells. Rates of change of pressure for the multiple wells are plotted by the heterogeneities mapping application using the scaled rates of change of pressure. Clusters of wells having rates of change of pressure within a threshold difference of other wells in a given cluster are determined by the heterogeneities mapping application based on the plotting. A detailed heterogeneities map of the main reservoir is generated by the heterogeneities mapping application based the clusters of wells. The heterogeneities map defines heterogeneous regions. Each heterogeneous region contains a set of wells assigned to the heterogeneous region based on the wells having similar rates of change of pressure.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Improvements in determining reservoir heterogeneities can be made over conventional systems that simply use time-lapse, single-point datum pressure data observed from wells to identify connected reservoir regions. Techniques of the present disclosure can use continuous pressure data during a simultaneous field shut-in. Doing this can provide a wide span of data records which can allow detailed heterogeneities to be identified at an early time, before the whole system homogenizes. Availability of pressure data at every well at each time during the shut-in can ensure that comparable data is interpreted at each elapsed shut-in time. Tools can be developed to use transient build-up pressure to directly calculate permeability using a log-log plot of delta-pressure and its derivative. Pressure build-up data obtained during field shut-down can be used as a tool for detailed reservoir description. Experimental investigation can be conducted using analytical equations and to formulate diagnostic equations that reveal reservoir characteristics from pressure build-up behavior. Experimental investigation can be conducted using numerical simulation models, from which field data can be analyzed using derived diagnostic analysis. Analytical experiments can be used to determine that the techniques can be applicable to injector wells. A spatial trend map can be generated for geo-model property distribution. The spatial trend map can be used in the absence of facies or seismic trend maps. Information from pressure transient data can be incorporated upstream in geo-model construction, rather than the traditional practice of waiting until the geo-model has been constructed and using information from pressure transient to do history matching. Traditional interpretations on pressure transient data to obtain permeability requires additional input data such as viscosity, height, and formation volume factor data. Uncertainty in these parameters can affect the calculated value of permeability. In approaches of the present disclosure, the focus is not on calculating permeability, but rather to delineate regions of the reservoir where permeability shows contrasts. Such regions can then be used with core and log data to build a reliable model of the reservoir.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 3A-3B are diagrams collectively showing an example of computer code that can be used in wells' pressure calculations using a superposition principle, according to some implementations of the present disclosure.

FIG. 10B is a graph showing examples of plots of individual well rate and build-up pressure after shut-down, according to some implementations of the present disclosure.

FIGS. 12A-12C are graphs showing examples of individual diagnostic plots for wells in each cluster, according to some implementations of the present disclosure.

FIGS. 19A-19C are graphs showing separate plots of the three main clusters, with separate plots of wells within each cluster, according to some implementations of the present disclosure.

FIG. 20 is a map showing examples of locations of the wells with shading-coded wells identified by diagnostic clusters, in the hypothetical reservoir, according to some implementations of the present disclosure.

Like reference numbers and designations in the various drawings indicate like elements.

DETAILED DESCRIPTION

Figures 1, 2:
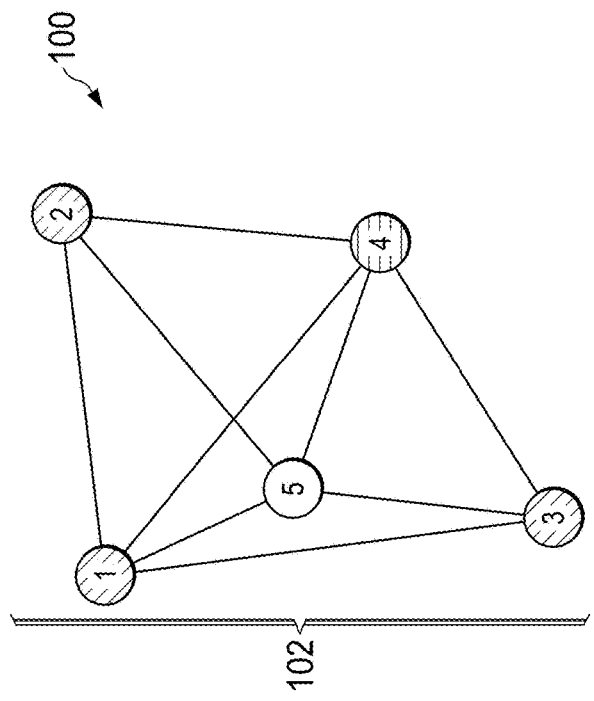
FIG. 1 is a diagram showing an example of a hypothetical reservoir with five wells and constant reservoir permeability, according to some implementations of the present disclosure.
FIG. 2 is a table showing example values for rock, fluid, and well data used for pressure calculation for the wells shown in FIG. 1, according to some implementations of the present disclosure.

The following detailed description describes techniques for receiving continuous pressure data during a simultaneous field shut-in of multiple wells of a main reservoir, and using the data to create a detailed heterogeneities map of the main reservoir. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes how transient buildup pressure in wells during shut-down can be harnessed for detailed reservoir characterization. For example, using the principle of flowrate and spatial superposition and regardless of each well's flowrate history or location, all wells within the same connected reservoir volume of constant permeability k (for example in millidarcies (md)) can have a similar $1/q*dP/dt$, where q is the well's pre-shut-in flow-rate (for example, in barrels per day (bbl/d)), dP is a change of pressure P (for example in pounds per square inch (psia)), and dt is a change in time. As a result, a diagnostic plot of $1/q*dP/dt$ vs elapsed time for all producers' transient build-up pressures can result in clusters that indicate the wells within each similar reservoir permeability. Observation wells cannot be used for this methodology because the wells have no pre-shut-in rate to be used for normalization. However, the present disclosure describes techniques for harnessing data acquired during a shut-down to obtain information to build a robust geological model.

A principle of superposition states that when multiple wells are producing in the same reservoir, the pressure at any of the well locations depends on the superposition effect of the well's rate history and the rate histories of other wells that are hydraulically connected to the well. A hydraulically connected well in this definition is important because if two wells that very far apart are producing from the same reservoir, at very small values of time, the pressure at each well is practically due to each well's own rate history because the impact of the other well(s) has not yet being felt at that early time.

If two wells separated by distance L, for example, producing from a reservoir for a time of $t_p$ hours at rates $q_1$ and $q_2$ respectively are both shut-in, the build-up transient pressure at well-1 can be given by:

$$P(r_{w1}, \Delta t) = P_i + \Delta P_1 + \Delta P_2 \quad (1)$$

$$\Delta P_1 = -70.6 \frac{\beta \mu q_1}{kh} Ei\left(\frac{-948 \varphi \mu c_t r_w^2}{k(t_p + \Delta t)}\right) - 70.6 \frac{\beta \mu (0-q_1)}{kh} Ei\left(\frac{-948 \varphi \mu c_t r_w^2}{k \Delta t}\right) \quad (2)$$

$$\Delta P_2 = -70.6 \frac{\beta \mu q_2}{kh} Ei\left(\frac{-948 \varphi \mu c_t L^2}{kt}\right) - 70.6 \frac{\beta \mu (0-q_2)}{kh} Ei\left(\frac{-948 \varphi \mu c_t L^2}{kt}\right) \quad (3)$$

where $\Delta P_2$ is a change in pressure (or the pressure drop) at well-1 due to the spatial superposition effect of well-2's flowrate history, L is an inter-well distance (for example, in feet), $\Delta t$ is an elapsed time since shut-in (for example, in hours), h is a reservoir thickness (for example, nine feet), $\varphi$ is a porosity (a fraction), $\mu$ is a viscosity (for example, in centipoise (cp)), $c_t$ is a compressibility (for example, in $psi^{-1}$), $r_w$ is a wellbore radius (for example, in feet), and $\beta$ is a formation volume factor (for example, in reservoir barrels/stock tank barrel (RB/STB)).

If well-2 is an injector well, in order to calculate build-up transient pressure at well-1, $\Delta P_1$ is exactly as given in Equation (2), while $\Delta P_2$ can be calculated by replacing $q_2$ in Equation (3) by $(-q_2)$ to give:

$$\Delta P_2 = +70.6 \frac{\beta \mu q_2}{kh} Ei\left(\frac{-948 \varphi \mu c_t L^2}{kt}\right) - 70.6 \frac{\beta \mu (0+q_2)}{kh} Ei\left(\frac{-948 \varphi \mu c_t L^2}{kt}\right) \quad (4)$$

If well-1 is an observation well, then $\Delta P_1 = 0$ and $\Delta P_2$ is exactly as given in Equation (3) or Equation (4), depending on whether the other well is a producer well or an injector well, respectively. A hypothetical reservoir case with 5 wells, as shown in FIG. 1, can be created.

FIG. 1 is a diagram showing an example of a hypothetical reservoir 100 with five wells 102 and constant reservoir permeability, according to some implementations of the present disclosure. In this example, within the wells 102, well-1, well-2, and well-3 are producers, well-4 is an injector, and well-5 is an observation well. In some examples, all the wells 102 can be simultaneously shut-in at a time $t_p=200$ hours. The simultaneous shut-in of all wells can be used to replicate what happens during a field shut-down.

FIG. 2 is a table 200 showing example values for rock, fluid, and well data used for pressure calculations for the wells 102 shown in FIG. 1, according to some implementations of the present disclosure. In some implementations, specialized applications can be developed to calculate the pressure at each well over, for example, 100 hours of shut-in.

FIGS. 3A-3B are diagrams collectively showing an example of computer code 300 that can be used in wells' pressure calculations using a superposition principle, according to some implementations of the present disclosure. The pressure build-up profile at each well is shown in FIG. 4.

Figure 4:
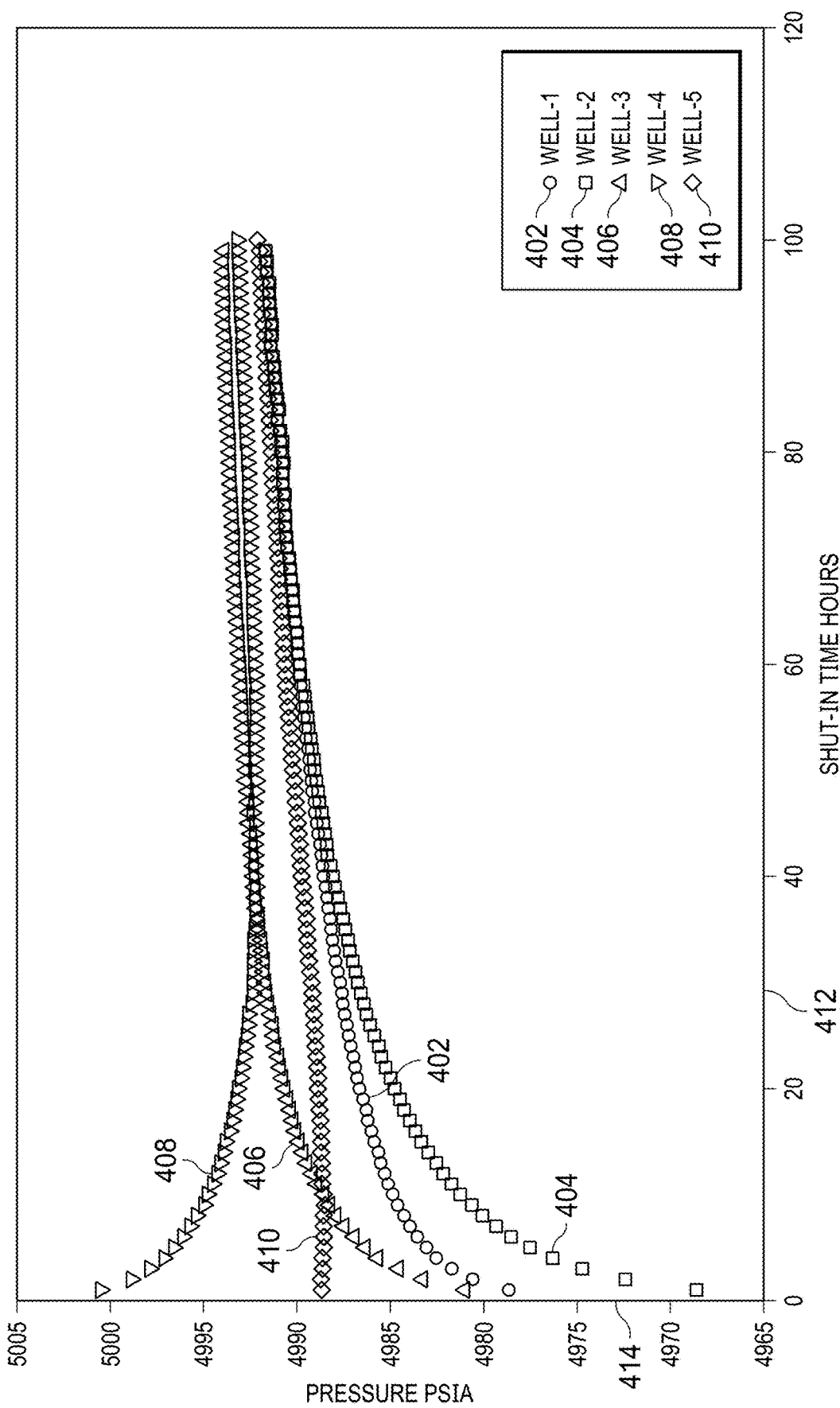
FIG. 4 is a graph showing examples of plots of transient pressure profile, according to some implementations of the present disclosure.

FIG. 4 is a graph 400 showing examples of plots 402-410 of transient pressure profile, according to some implementations of the present disclosure. For example, the plots 402-410 show transient pressure profiles at each well location after shut-down at $t_p=200$ hours. The plots 402-410 are plotted relative to a shut-in time 412 (for example, in hours) and a pressure 414 (for example, is pounds per square inch, absolute (psia)).

Figure 5:
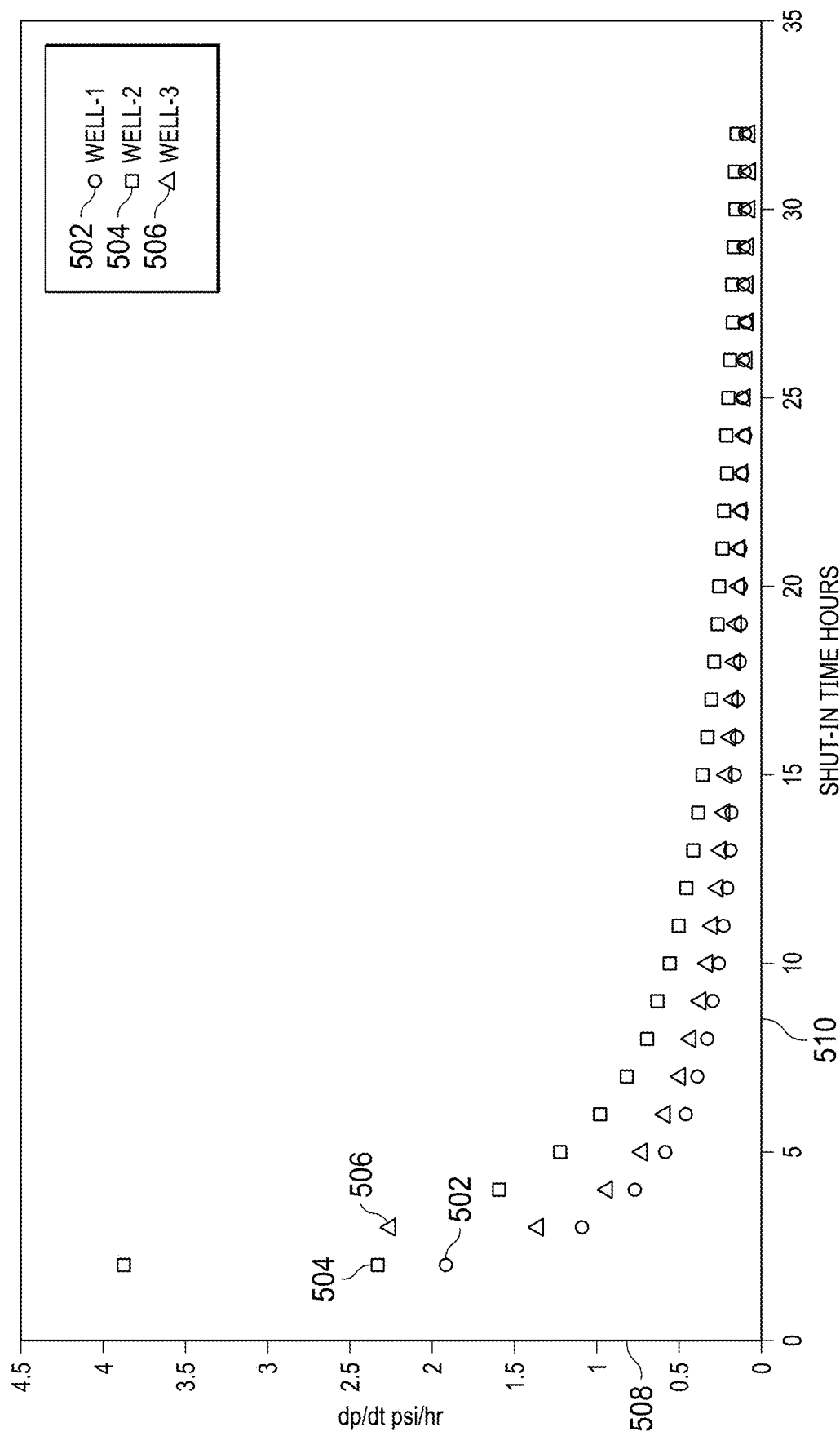
FIG. 5 is a graph showing an example of plots of pressure changes over time during shut-in for wells 1, 2, and 3, according to some implementations of the present disclosure.
Figure 6:
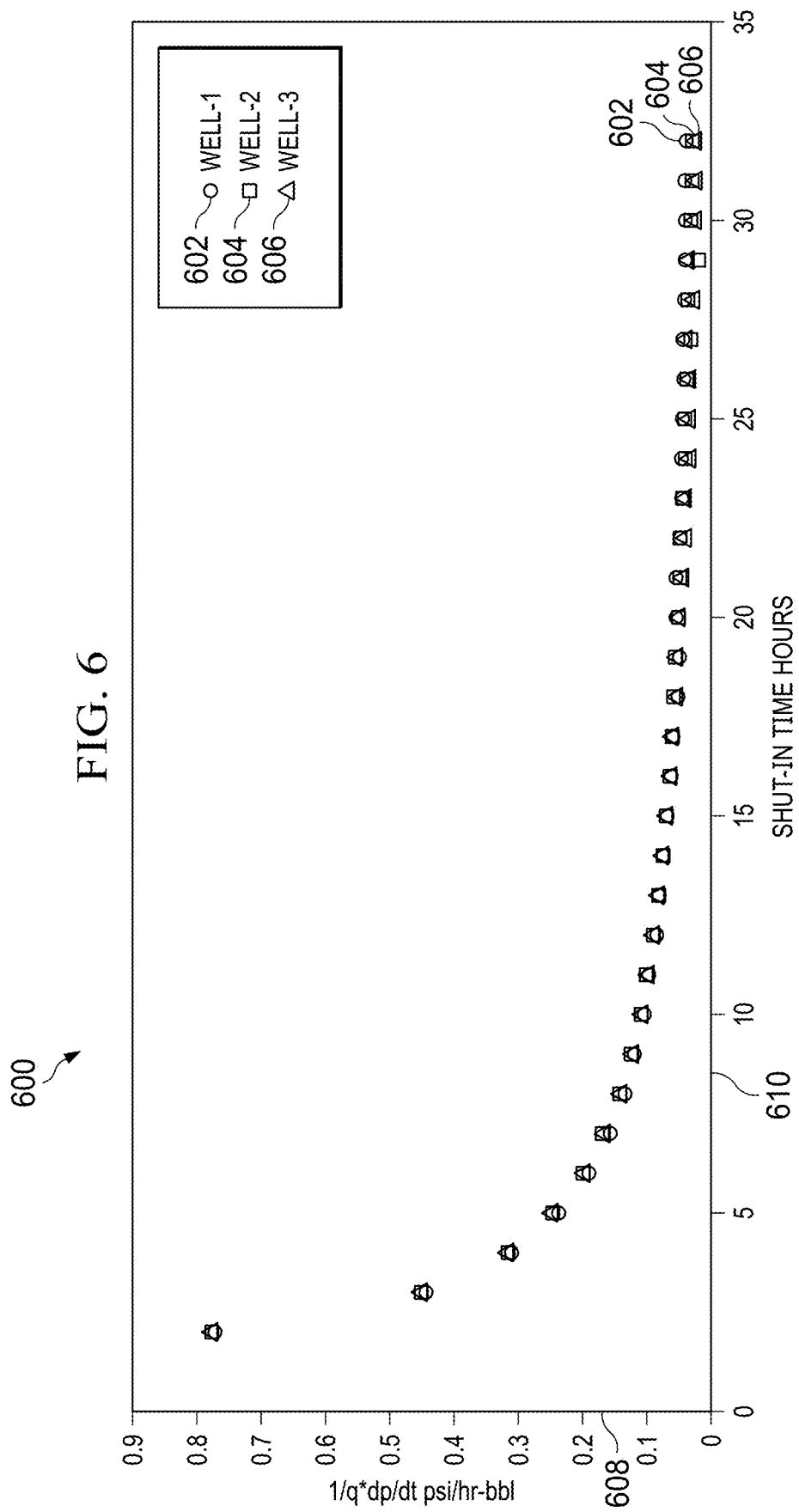
FIG. 6 is a graph showing an example of plots of pressure changes over time during shut-in for wells 1, 2, and 3, according to some implementations of the present disclosure.

The instantaneous rate of change of pressure for each producer can be calculated and then normalized by the last producing rate, resulting in the plots of FIG. 5 and FIG. 6, using:

$$\text{Diagnostic} = \frac{1}{q} * \frac{P^n - P^{n-1}}{t^n - t^{n-1}} \quad (5)$$

where n=a number of time steps.

FIG. 5 is a graph 500 showing an example of plots 502, 504, and 506 of pressure changes over time during shut-in for wells 1, 2, and 3, according to some implementations of the present disclosure. For example, the plots 502-506 show a rate of change of pressure 508 over a shut-in time 510 for the three producers.

FIG. 6 is a graph 600 showing an example of plots 602, 604, and 606 of pressure changes over time during shut-in for wells 1, 2, and 3, according to some implementations of the present disclosure. A scaled rate of change of pressure 608 relative to a shut-in time 610 for the three producers is normalized by each well's last flowrate.

Figure 7:
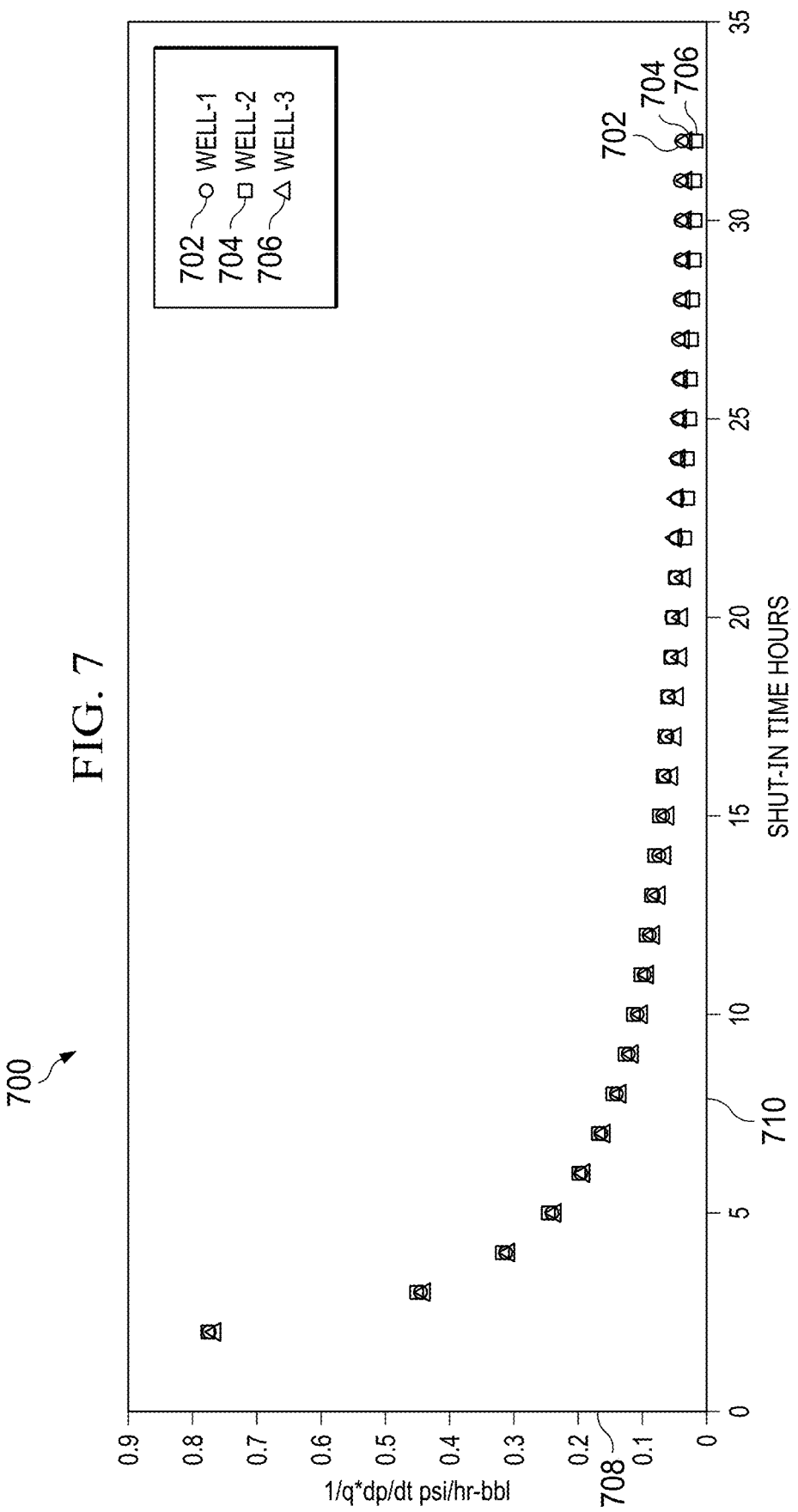
FIG. 7 is a graph showing an example of plots of a scaled rate of change of pressure over a shut-in time during shut-in for wells 1, 2, and 3, according to some implementations of the present disclosure.

Observations were conducted regarding wells' locations and reservoir/well properties to arrive at a similar observation during full-field shut-down. In this case, the instantaneous rate of change of wellbore pressure, normalized with the last producing rate, was determined to be similar at all producing well locations that are within a similar reservoir quality. FIG. 7 shows a sensitivity in which the wells' production rates were changed.

FIG. 7 is a graph 700 showing an example of plots 702, 704, and 706 of a scaled rate of change of pressure 708 over a shut-in time 710 during shut-in for wells 1, 2, and 3, according to some implementations of the present disclosure. The graph 700 illustrates sensitivities on flowrates showing that diagnostics analysis is independent of flowrate history. The outcome of FIG. 7 is similar to FIG. 6, meaning that the result is independent of flowrate history of the wells. In this example, only the permeability was changed from 1000 millidarcies (md) to 100 md, and the observation was the same except that the axis of the plot has now increased by a factor of 10, as shown in FIG. 8.

Figure 8:
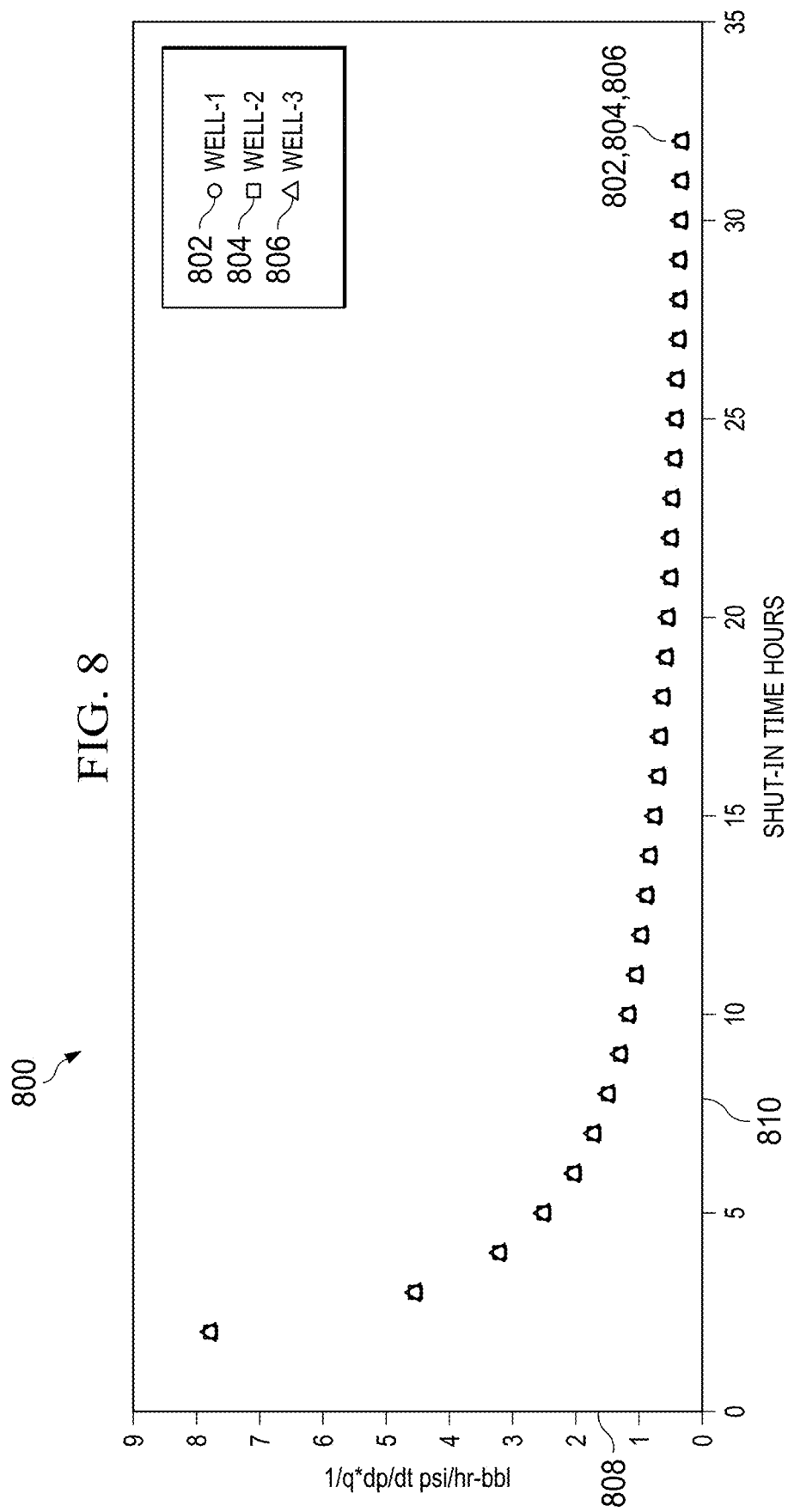
FIG. 8 is a graph showing an example of plots of a scaled rate of change of pressure over time during shut-in for wells 1, 2, and 3, according to some implementations of the present disclosure.

FIG. 8 is a graph 800 showing an example of plots 802, 804, and 806 of a scaled rate of change of pressure 808 over time 810 during shut-in for wells 1, 2, and 3, according to some implementations of the present disclosure. The graph 800 shows the plots 802, 804, and 806 virtually on top of each other. A rate of change of pressure with time for the three producers is normalized by each's last flowrate for permeability=100 md for the reservoir. Observations made by the plots of FIGS. 4-8 can lead to a hypothesis that within a heterogeneous reservoir, a diagnostic plot of 1/q*dp/dt vs. elapsed time for shut-in bottom-hole pressure will produce a clustering that could be used to delineate areas of the reservoir that have similar reservoir qualities.

Figure 9:
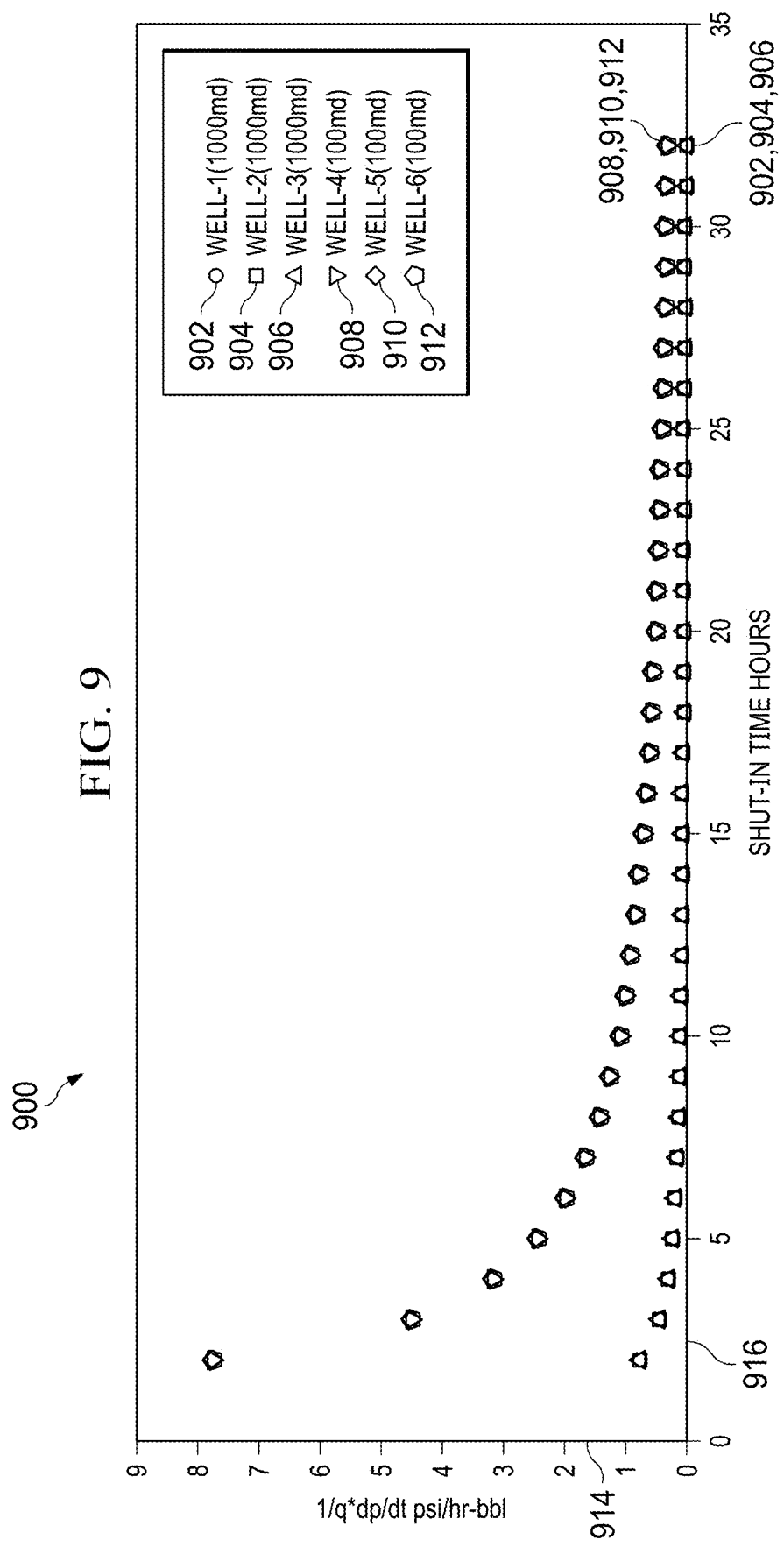
FIG. 9 is a graph showing an example of a combination of the plots of FIG. 6 and FIG. 7 on a same graph, according to some implementations of the present disclosure.

FIG. 9 is a graph 900 showing an example of a combination of the plots of FIG. 6 and FIG. 7 on a same graph, according to some implementations of the present disclosure. The graph 900 shows different reservoir permeability results in diagnostic plot clustering. The graph 900 indicates the kind of clustering that can be expected from a diagnostic plot of wells' transient pressures during a field shut-down. All wells within the same reservoir permeability overlay each other and are separated from the wells within a different permeability quality. Different scenarios of numerical simulation experiments can be conducted to investigate the analytical observations described previously. The graph 900 shows plots 902-906 for wells 1, 2, 3 at 1000 md and plots 908-912 for wells 1, 2, 3 at 100 md, with an overlap of plotted points. The plots 902-912 are plotted relative to a scaled rate of change of pressure 914 over a shut-in time 916 during shut-in for wells 1, 2, and 3.

Figure 10A:
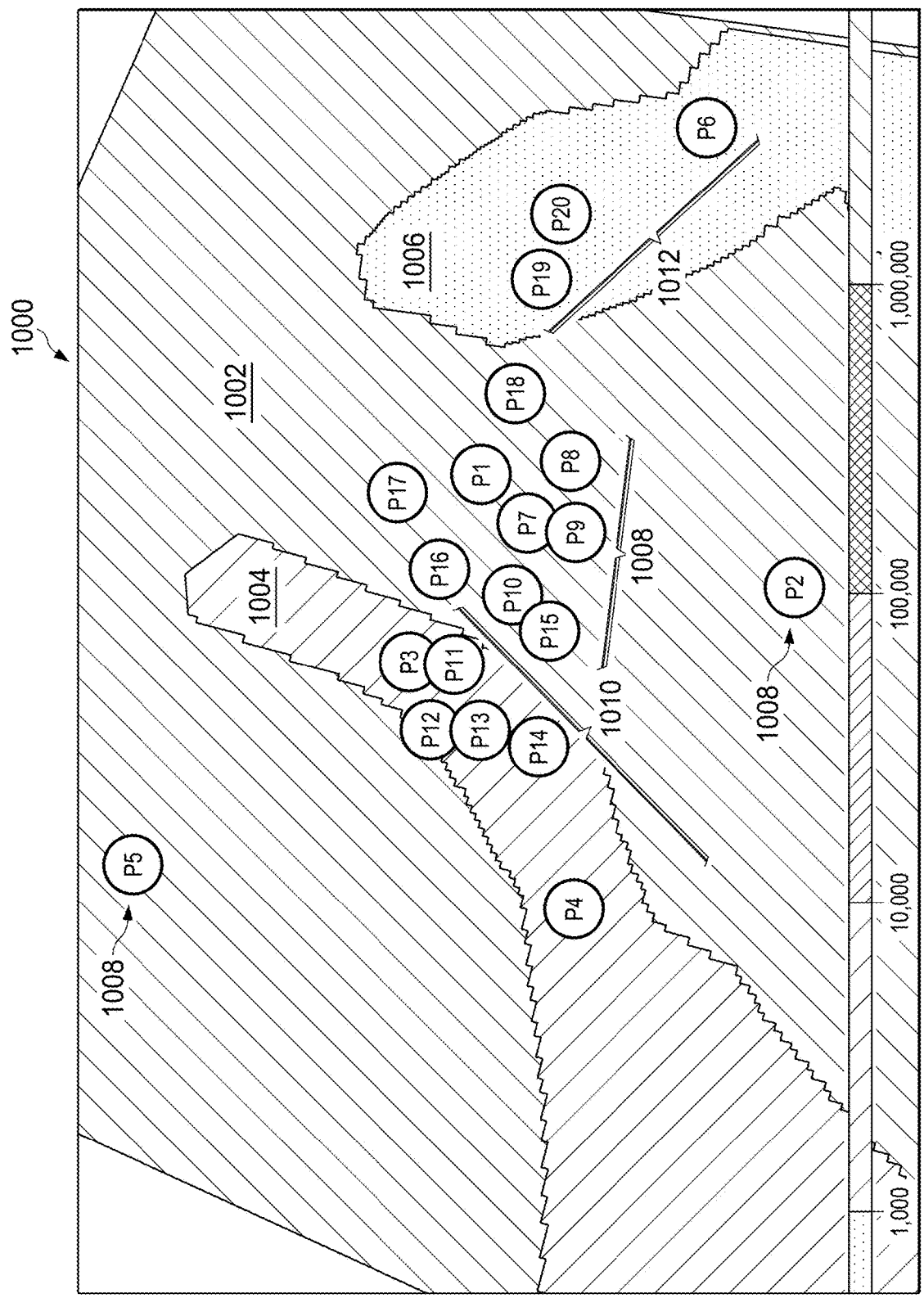
FIG. 10A is a map of a hypothetical reservoir having three heterogeneous units, according to some implementations of the present disclosure.

FIG. 10A is a map of a hypothetical reservoir 1000 having three heterogeneous units 1002, 1004, and 1006, according to some implementations of the present disclosure. The heterogeneous units 1002, 1004, and 1006 contain producing wells 1008, 1010, and 1012, respectively.

FIG. 10B is a graph showing examples of plots of individual well rate 1058 and build-up pressure 1060 after shut-down, according to some implementations of the present disclosure. FIG. 10B shows pressure build-up for all wells after three years of variable rate production. The plots in FIG. 10B include plots 1052, 1054, and 1056 corresponding to production wells Prod-6 (P6), P19, and P20, respectively, of the heterogeneous unit 1006. The other plots in FIG. 10B correspond to individual production wells in the other heterogeneous units 1002 and 1004. The plots in FIG. 10B show that the wells within the same region have overlapping plots.

A first scenario illustrated by FIGS. 9, 10A, 10B, 11 and 12 includes the hypothetical reservoir 1000 having the three heterogeneous units 1002, 1004, and 1006 and a constant permeability within each unit. In this example, a hypothetical model can be created as shown in FIG. 9 and having 3 regions. Region-1 corresponding to heterogeneous unit 1002 has a constant permeability of 500 md. Region-2 corresponding to heterogeneous unit 1004 has a constant permeability of 50 md. Region-3 corresponding to heterogeneous unit 1006 has a constant permeability of 10 md.

Figure 11:
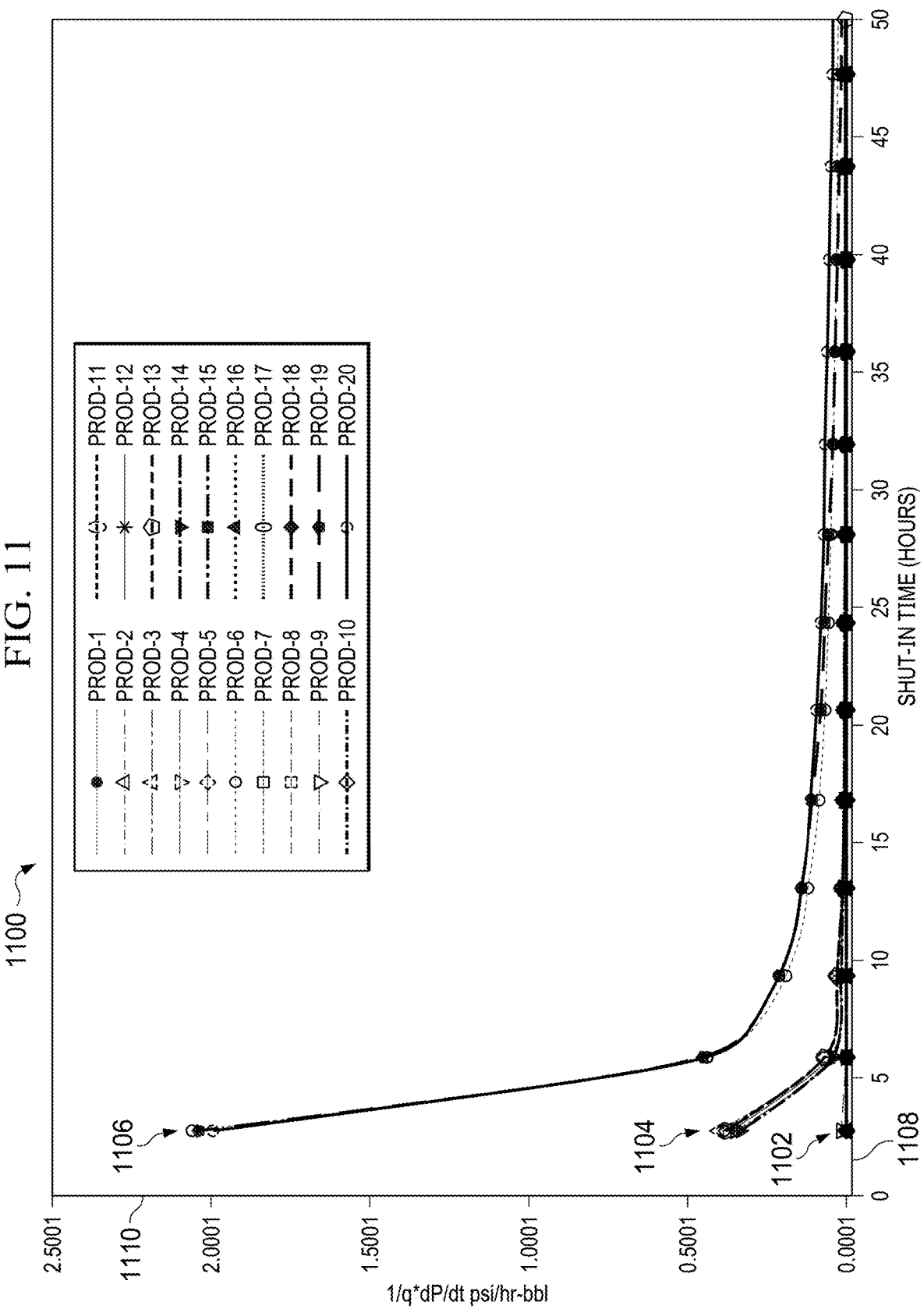
FIG. 11 is a graph showing examples of diagnostic analysis showing three different clusters of wells, according to some implementations of the present disclosure.

FIG. 11 is a graph 1100 showing examples of diagnostic analysis showing three different clusters 1102, 1104, and 1106 of wells, according to some implementations of the present disclosure. The clusters 1102, 1104, and 1106 are shown relative to shut-in time 1108 and a scaled rate of change of pressure 1110.

Figure 12B:
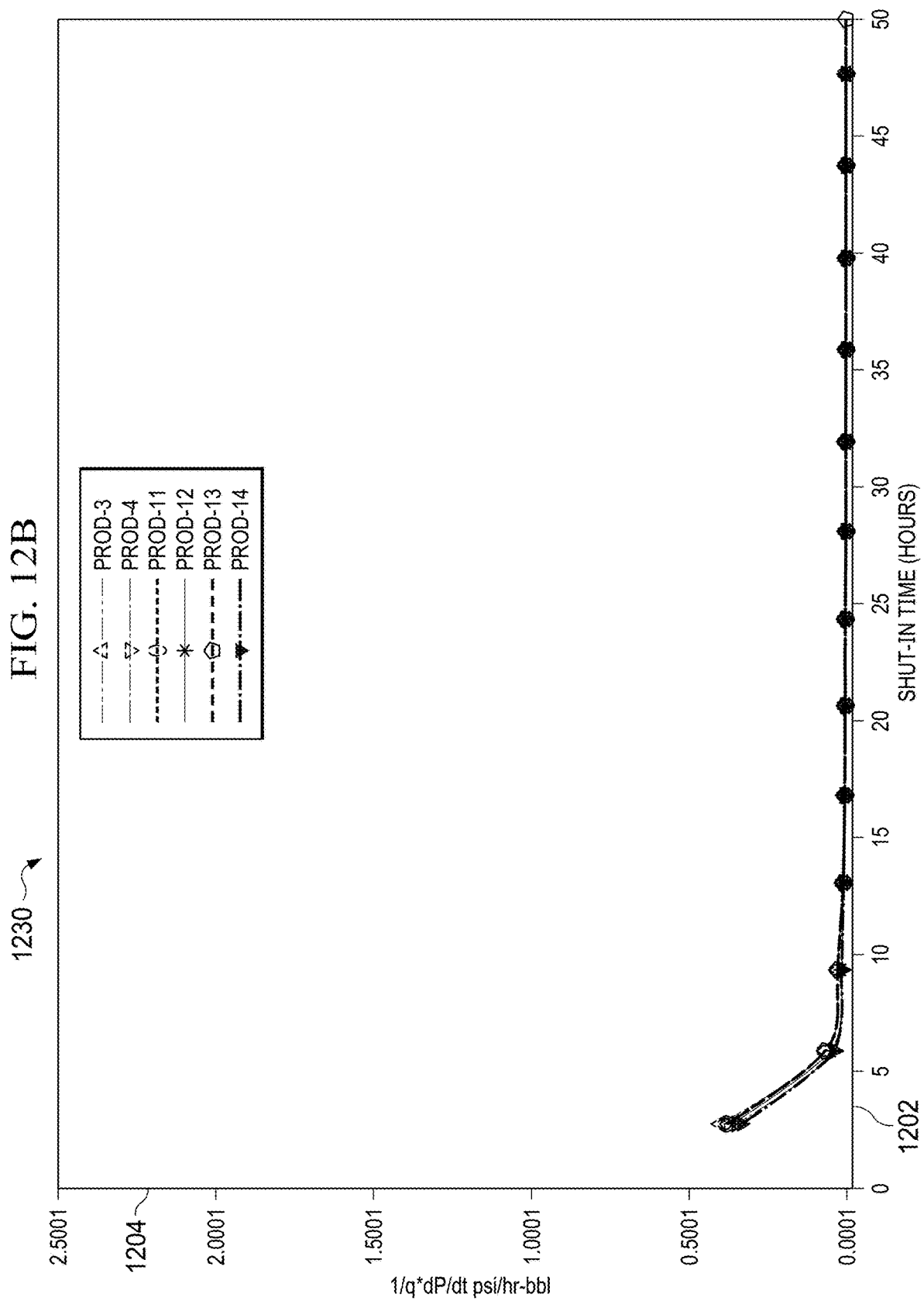

FIGS. 12A-12C are graphs 1200, 1230, and 1260 showing examples of individual diagnostic plots for wells in each cluster, according to some implementations of the present disclosure. The graphs 1200, 1230, and 1260, plotted relative to shut-in time 1202 and a scaled rate of change of pressure 1204, correspond to heterogeneous units 1002, 1004, and 1006.

A second scenario includes a hypothetical reservoir having three heterogeneous units and a Gaussian normal distribution of permeability within each hydraulic unit. The second scenario is described with reference to FIG. 13 and subsequent figures.

Figure 13:
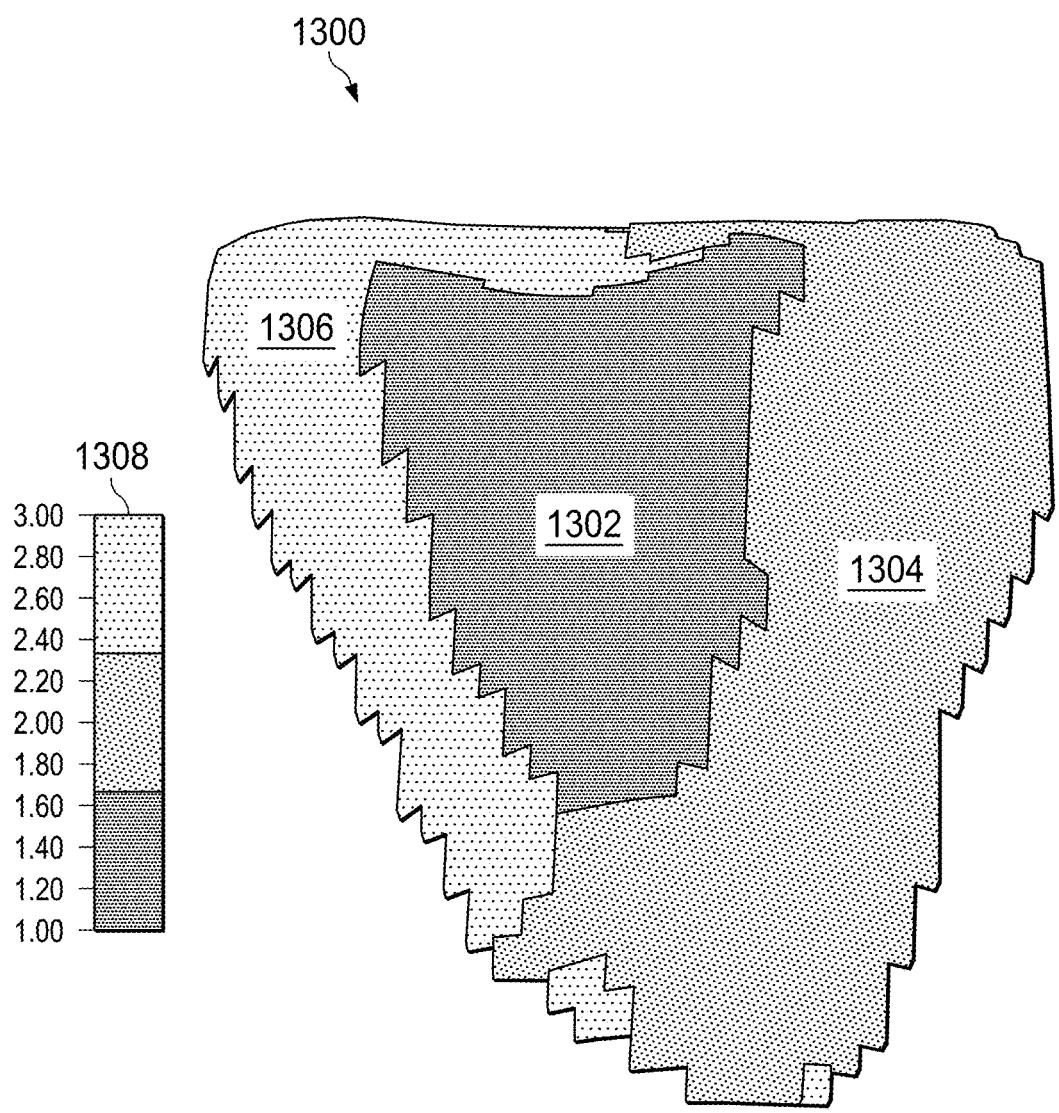
FIG. 13 is a plot showing an example of a hypothetical reservoir having three heterogeneous regions according to some implementations of the present disclosure.
Figures 14, 28:
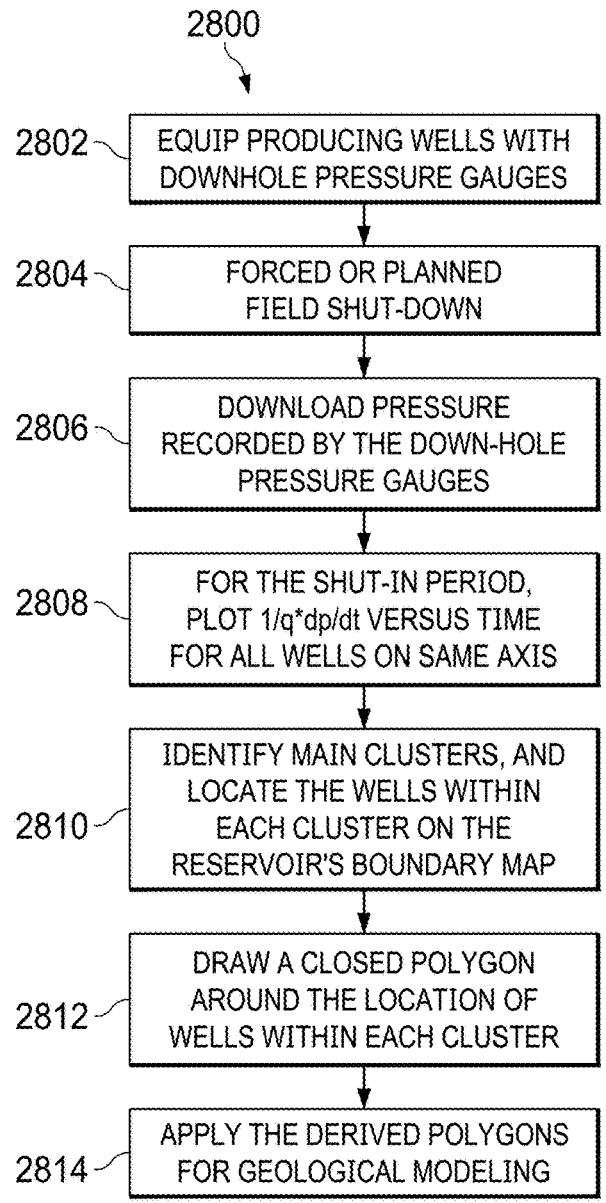
FIG. 14 is a table showing example values of input parameters used to generate a hypothetical model, according to some implementations of the present disclosure.
FIG. 28 is a flowchart of an example of a method for determining homogeneous regions for geological modeling, according to some implementations of the present disclosure.

FIG. 13 is a plot showing an example of a hypothetical reservoir 1300 having three heterogeneous regions 1302, 1304, and 1306, according to some implementations of the present disclosure. The heterogeneous regions 1302, 1304, and 1306 are used as containers within which the parameters of FIG. 14 are used to individually distribute porosity and permeability and thereby resulting in elements 1500 and 1550, respectively. In general, it is possible to obtain 1500 and 1550 because of the constrained used of input data 1400 with the map 1300. In the oil-field business, in order to build a geological model of a reservoir, core data and log data obtained from wells are used as inputs. However, it is not always possible to propagate this discrete well data in space. Traditionally, spatial trend maps such as facies map and seismic can be used as 3D spatial control. A goal in the techniques of the present disclosure is to be able to derive another kind of spatial control map for any reservoir of interest using available pressure data.

For each region, a minimum and maximum porosity and permeability can be defined as shown in FIG. 14. A geo-modelling tool can then be used to generate a 3D porosity using normal distribution. Then the geo-modeling tool can be used to create a permeability model using a normal distribution with collocation co-Kriging to porosity with a factor of 0.8.

FIG. 14 is a table 1400 showing example values of input parameters used to generate a hypothetical model, according to some implementations of the present disclosure. The parameters include values for a minimum (min) porosity/permeability (poro/perm), a maximum (max) poro/perm, a mean poro/perm, and a standard deviation (SD) poro/perm. Resulting porosity and permeability models are shown in FIGS. 15A and 15B.

Figure 15A:
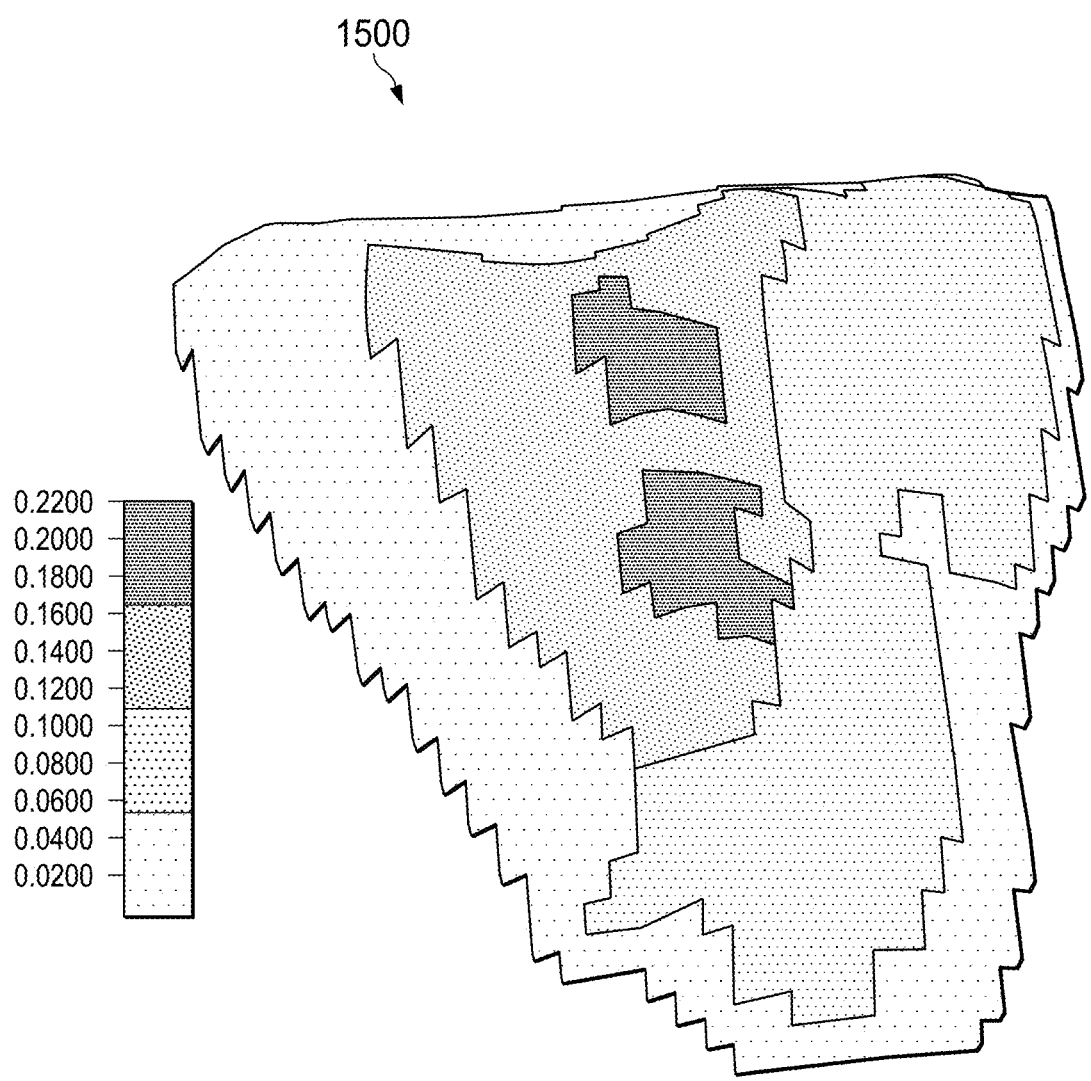
FIG. 15A is an example of a plot showing a porosity model of a hypothetical reservoir, according to some implementations of the present disclosure.
Figure 15B:
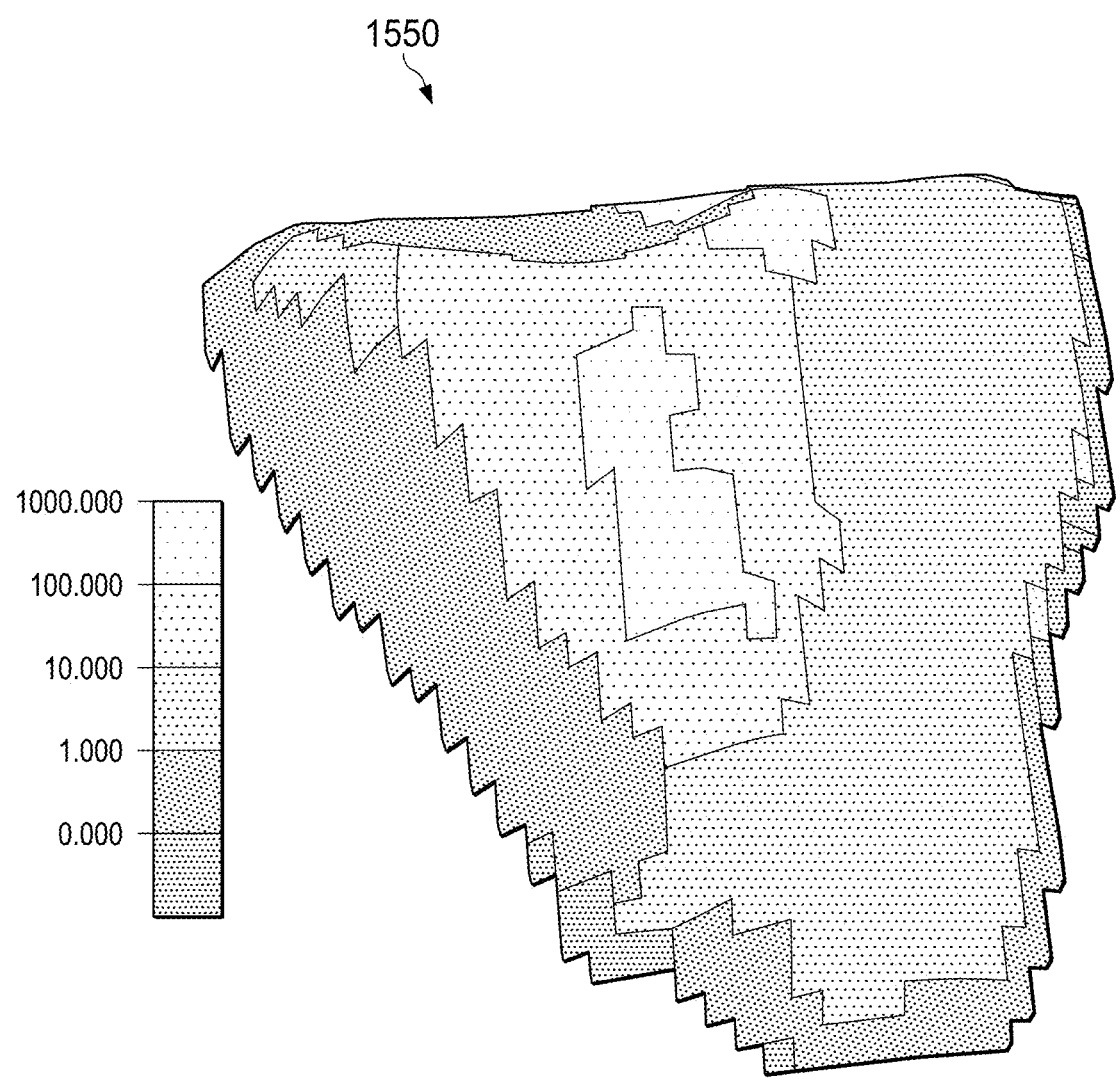
FIG. 15B is an example of a plot showing a permeability model of a hypothetical reservoir, according to some implementations of the present disclosure.

FIG. 15A is an example of a plot showing a porosity model 1500 of a hypothetical reservoir, according to some implementations of the present disclosure. FIG. 15B is an example of a plot showing a permeability model 1550 of a hypothetical reservoir, according to some implementations of the present disclosure.

Figure 16:
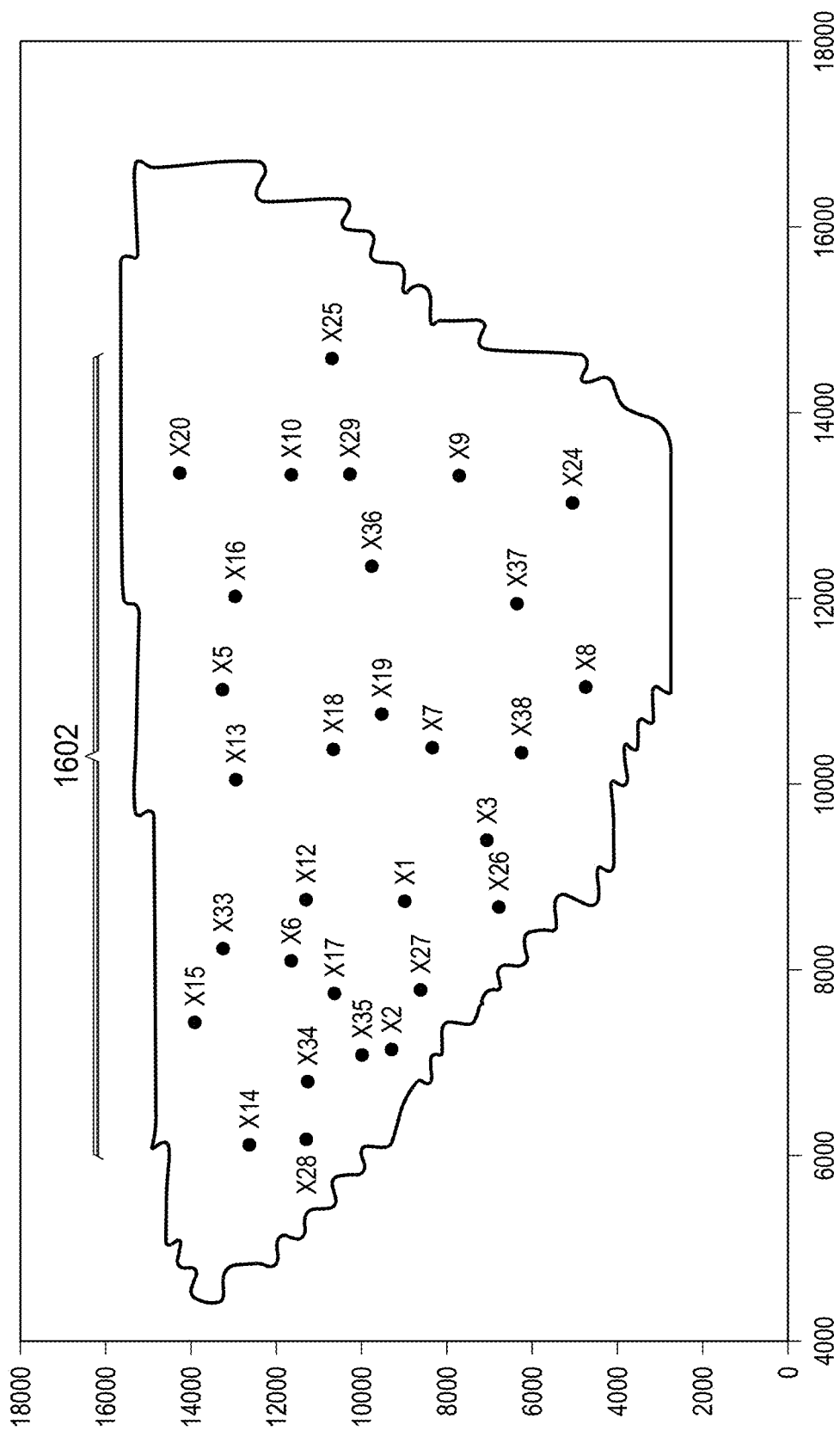
FIG. 16 is a map showing examples of locations of the wells in the hypothetical reservoir, according to some implementations of the present disclosure.

FIG. 16 is a map 1600 showing examples of locations 1602 of the wells in the hypothetical reservoir, according to some implementations of the present disclosure. The wells, marked with names in a range of X1-X38, are an example from an actual group of wells that produced for 6 years and then were shut in. The shut-in pressure transient for all the wells are as shown in FIG. 17.

Figure 17:
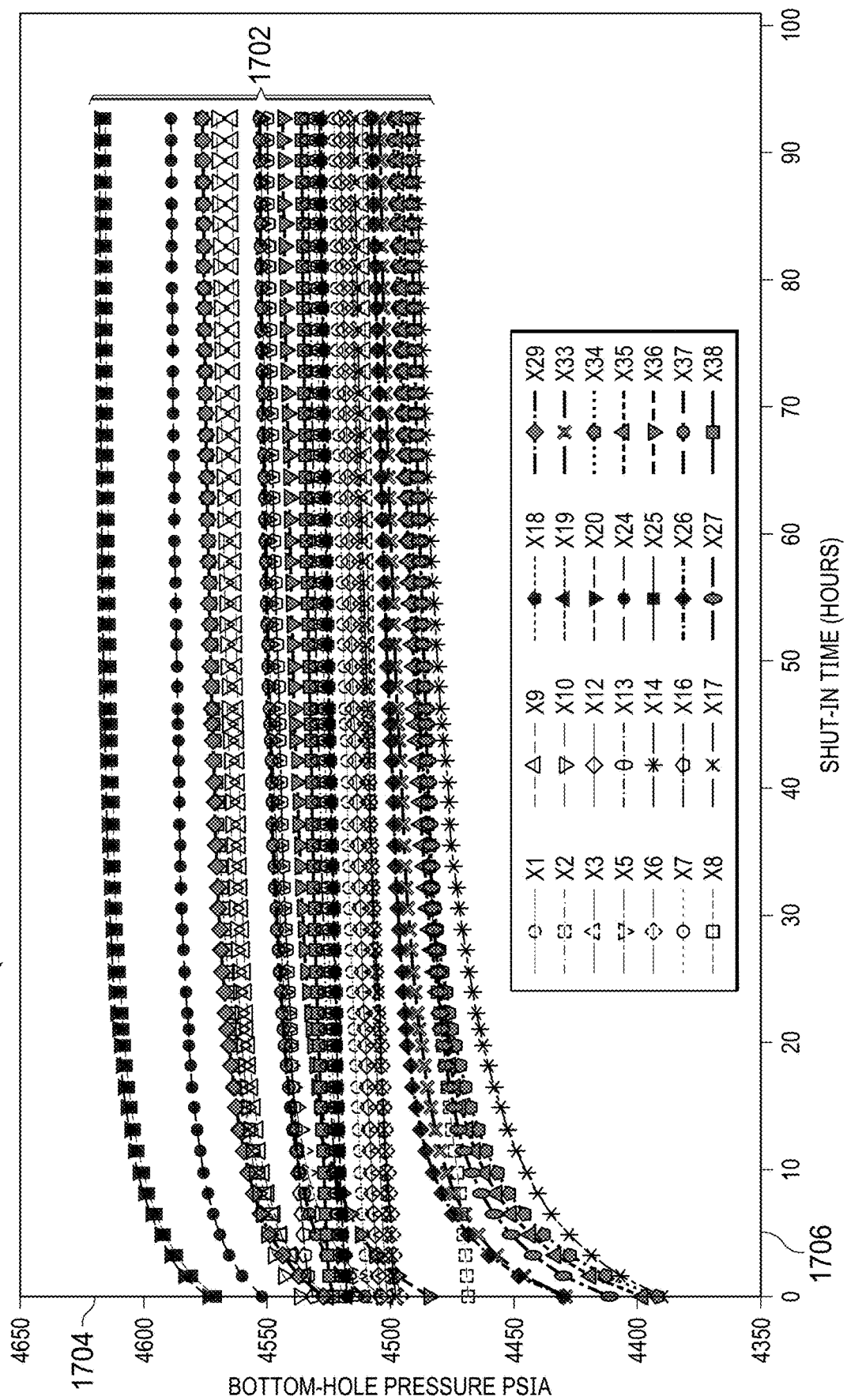
FIG. 17 is a graph showing examples of pressure build-up plots for wells during shut-in, according to some implementations of the present disclosure.

FIG. 17 is a graph 1700 showing examples of pressure build-up plots 1702 for wells during shut-in, according to some implementations of the present disclosure. The plots 1702 are plotted relative to bottom hole pressure 1704 (for example, in psia) and shut-in time 1706 (for example, in hours). Analysis of the rate and well transient pressure using techniques of the present disclosure can result in the plot shown in FIG. 18.

Figure 18:
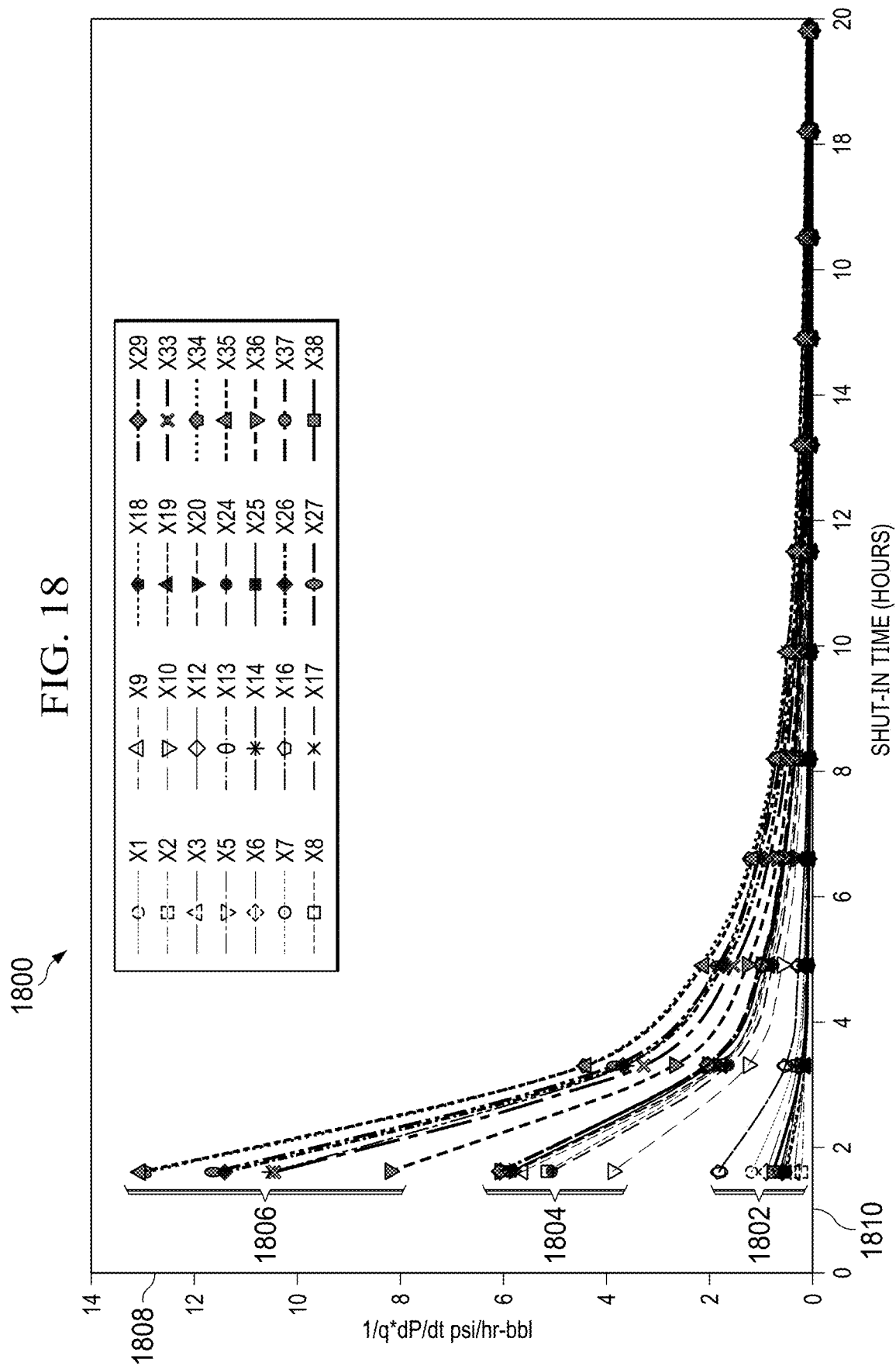
FIG. 18 is a graph showing examples of diagnostic plots corresponding to three main clusters, according to some implementations of the present disclosure.

FIG. 18 is a graph 1800 showing examples of diagnostic plots corresponding to three main clusters 1802, 1804, and 1806, according to some implementations of the present disclosure. The plots are plotted relative to a scaled rate of change of pressure 1808 and a shut-in time 1810. Three main clusters 1802, 1804, and 1806 become immediately evident as shown separately in FIGS. 19A-19C.

Figure 19B:
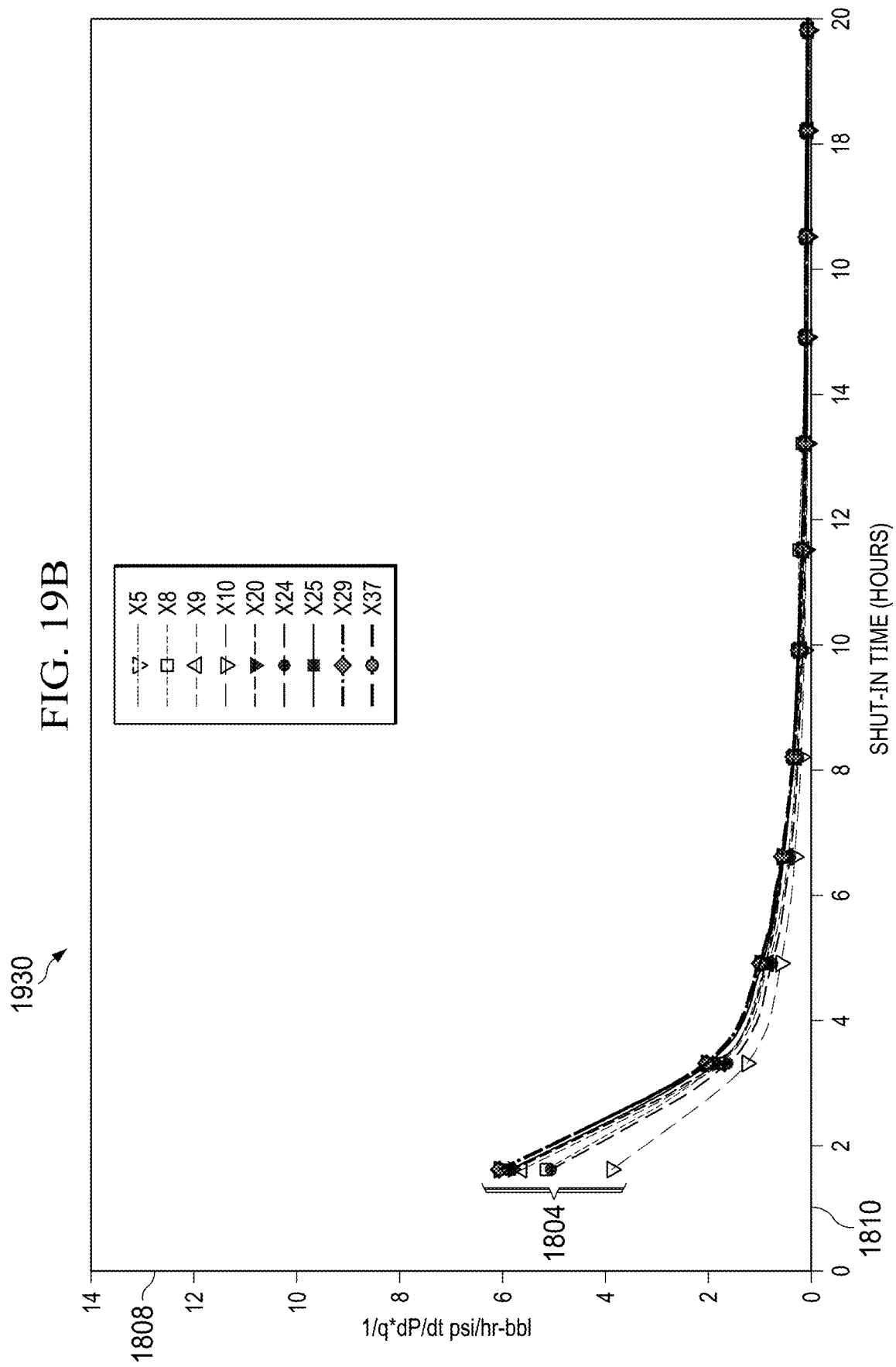
Figure 19C:
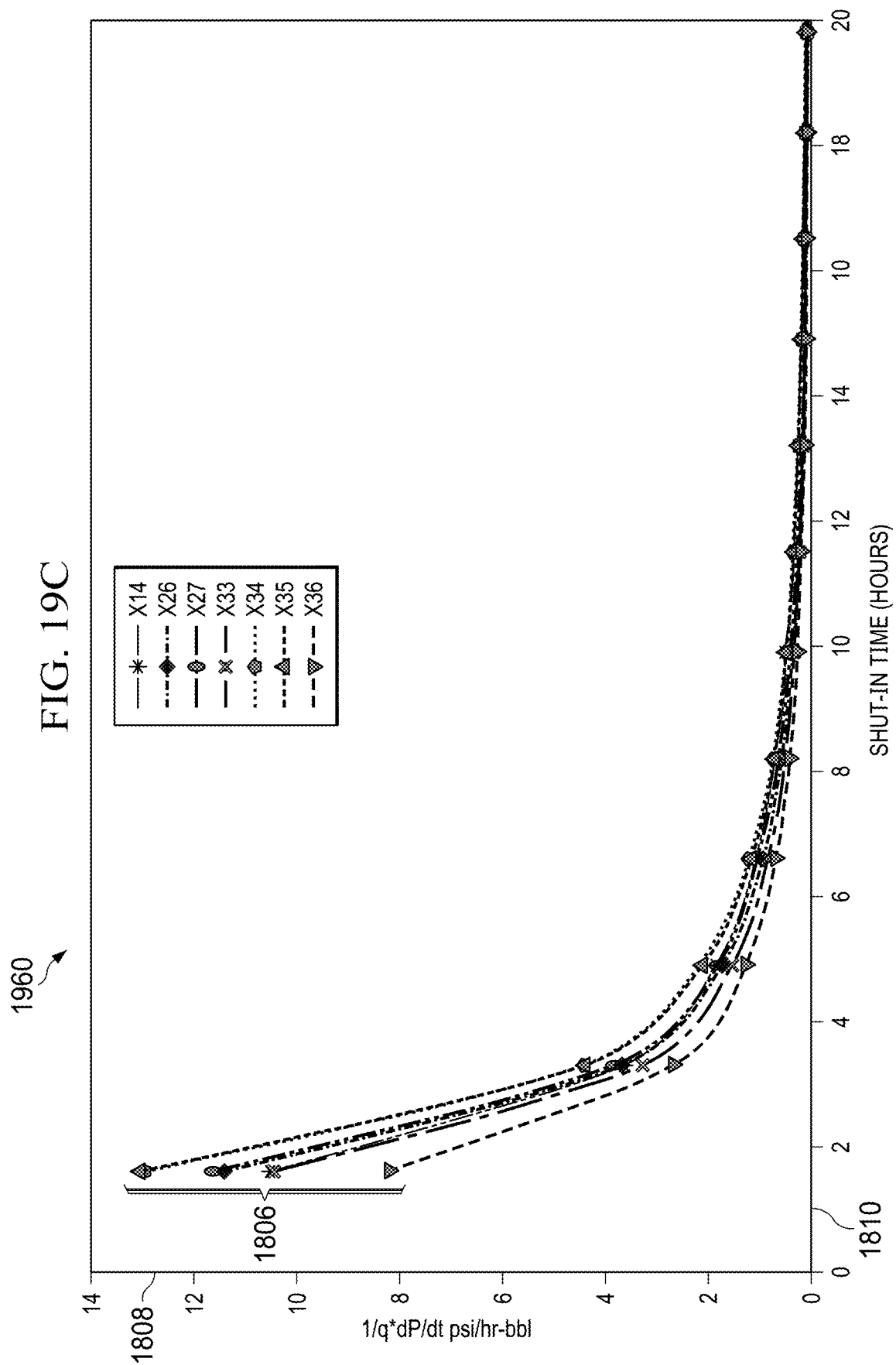

FIGS. 19A-19C are graphs 1900, 1930, and 1960 showing separate plots of the three main clusters 1802, 1804, and 1806, with separate plots of wells within each cluster, according to some implementations of the present disclosure. In this scenario, the plots of all the wells in each cluster are not perfectly aligned as expected by theory (for example, with reference to the description of FIG. 6). As a result, small differences within each cluster reflect the heterogeneities within each cluster. The map shown in FIG. 16, with shading-coded wells identified by diagnostic group, can be used to obtain FIG. 20.

FIG. 20 is a map showing examples of locations 2002 of the wells with shading-coded wells identified by diagnostic clusters, in the hypothetical reservoir, according to some implementations of the present disclosure. Boundaries can be drawn around similar groups of wells to obtain FIG. 21.

Figure 21:
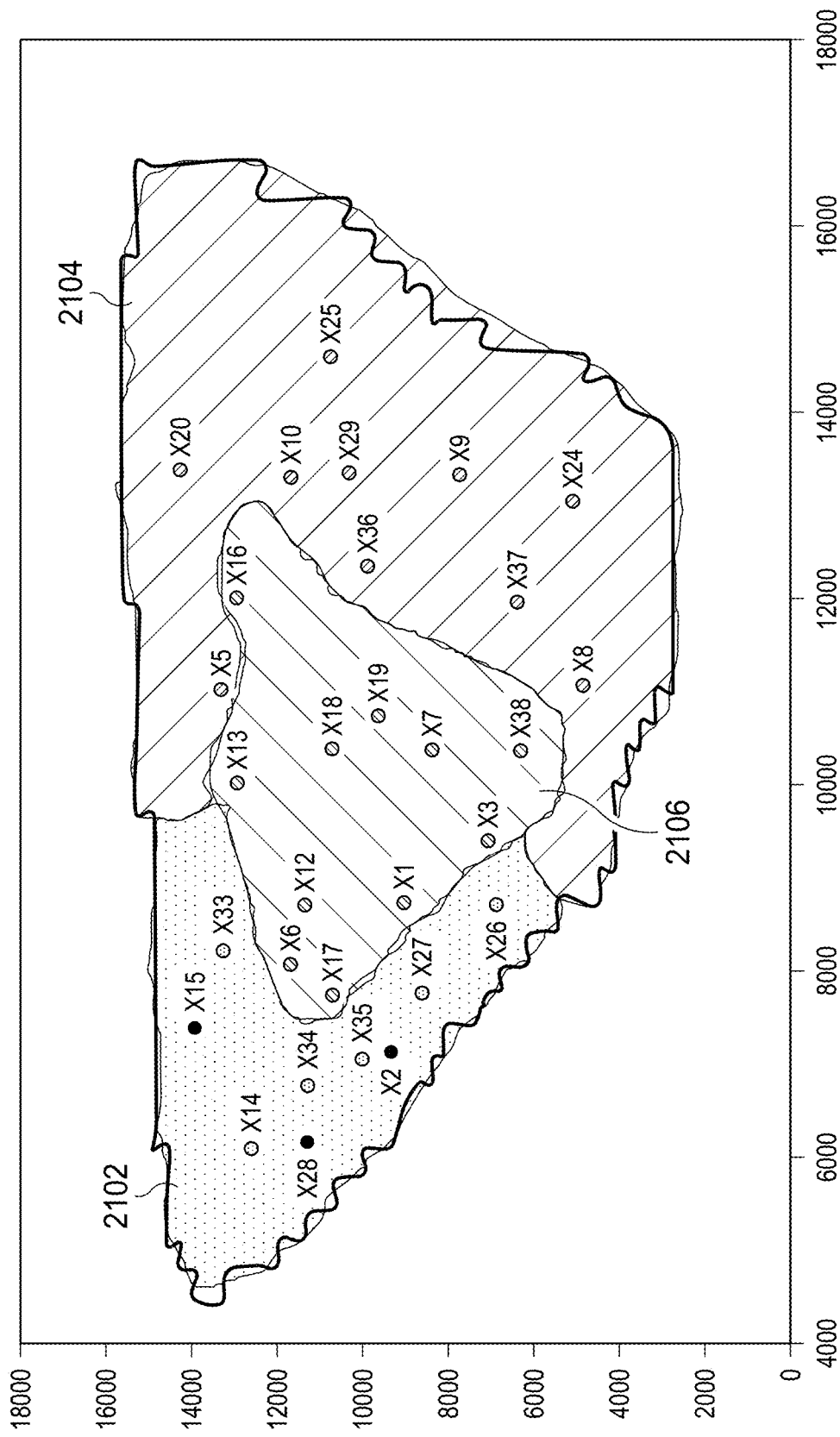
FIG. 21 is a map showing examples of connected reservoir regions showing boundaries of main permeability heterogeneities, according to some implementations of the present disclosure.

FIG. 21 is a map showing examples of connected reservoir regions 2102, 2104, and 2106 showing boundaries of main permeability heterogeneities, according to some implementations of the present disclosure. The regions shown in FIG. 21 are similar to the original hypothetical regions shown in FIG. 13. These results imply that the present disclosure's diagnostic analysis of shut-in transient pressure can be used to determine the large-scale heterogeneity existing within a reservoir. For example in FIG. 21, it is not known that a boundary exists between wells X19 and X36 because the two wells show different diagnostic behavior (as shown in FIGS. 19A and 19B). However, since the precise location of this boundary is uncertain, an approximate assumption of a mid-way location is taken in FIG. 21. As the total number of wells increases, a more accurate definition of the boundaries can be obtained. For example, if a future well is drilled between wells X19 and X36, the diagnostic response of this future well would help to refine the location of the boundary passing through X19 and X36. This information can be used in the absence of a facies model, for example, to guide the distribution of core porosity and permeability during building of geological model. In order to show how FIG. 21 can be used to improve the robustness of geological model, upscaled porosity and permeability logs can be created from FIGS. 15A and 15B for the wells shown in FIG. 22.

Figure 22:
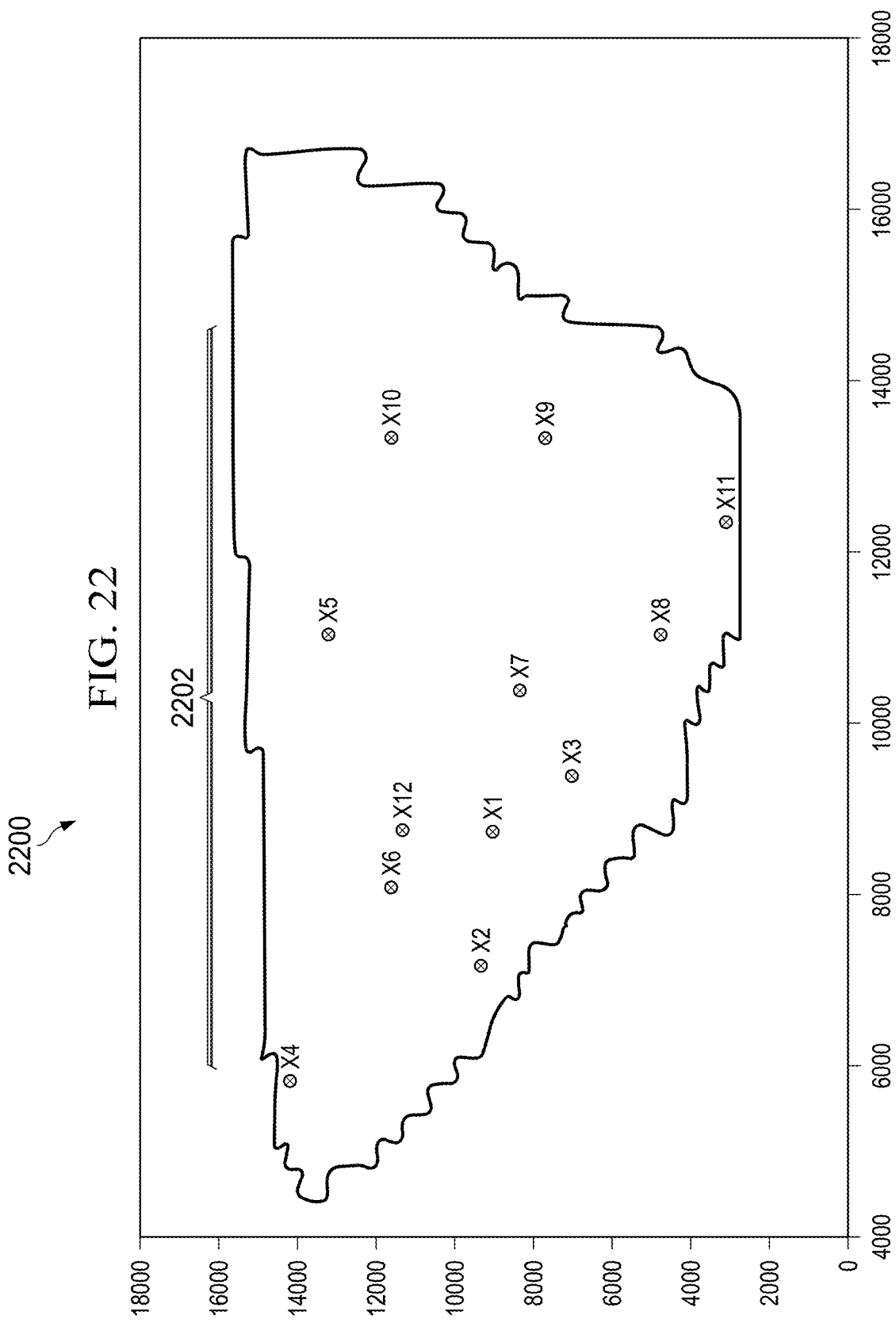
FIG. 22 is a map showing examples of locations of hypothetical cored wells, according to some implementations of the present disclosure.

FIG. 22 is a map showing examples of locations of hypothetical cored wells, according to some implementations of the present disclosure. In the absence of a facies model, geological modeling can be done traditionally using purely statistical approach such as Sequential Gaussian Simulation (SGS). Using the upscaled logs of the wells shown in FIG. 22 and SGS, the resulting porosity and permeability model shown in FIGS. 23A and 23B can be generated.

Figure 23A:
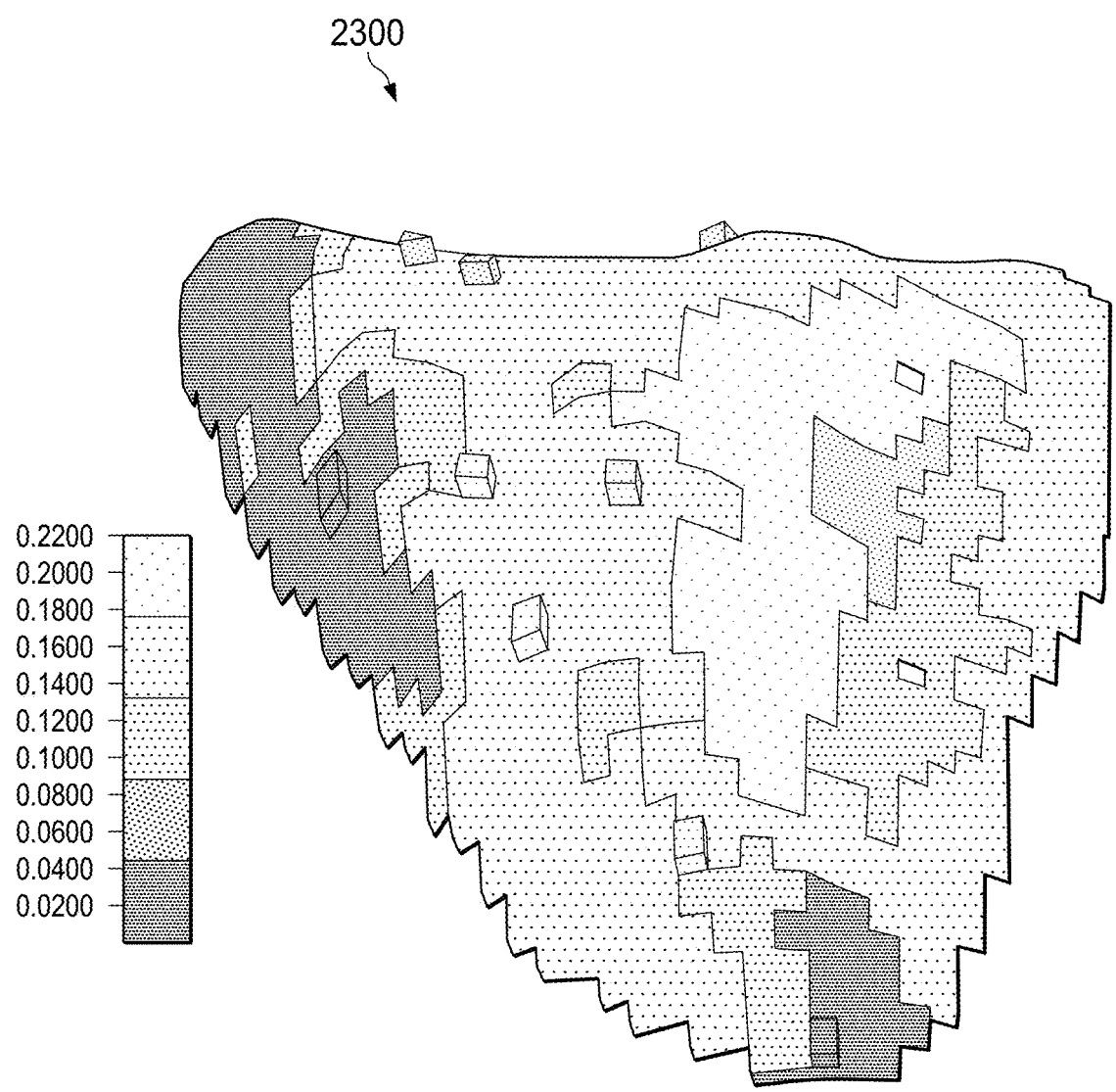
FIG. 23A is an example of a plot showing a Sequential Gaussian Simulation (SGS)-based porosity model for a hypothetical reservoir, according to some implementations of the present disclosure.
Figure 23B:
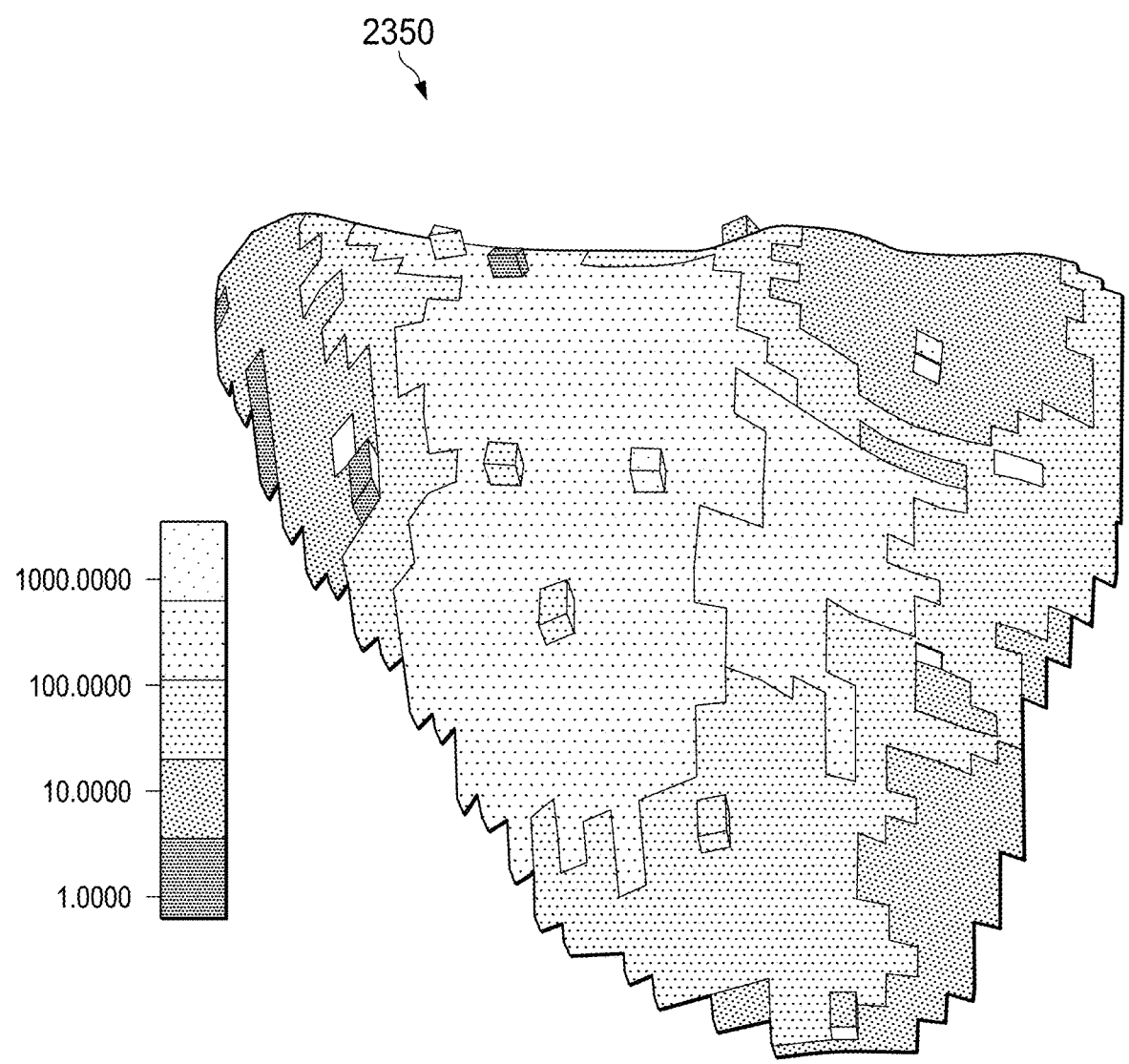
FIG. 23B is an example of a plot showing an SGS-based permeability model of a hypothetical reservoir, according to some implementations of the present disclosure.

FIG. 23A is an example of a plot showing an SGS-based porosity model 2300 for a hypothetical reservoir, according to some implementations of the present disclosure. FIG. 23B is an example of a plot showing an SGS-based permeability model 2350 of a hypothetical reservoir, according to some implementations of the present disclosure. The models 2300 and 2350 are three-dimensional (3D) geological models using the SGS algorithm, according to some implementations of the present disclosure. However, when the upscaled logs of the wells shown in FIG. 22 are used and the regions shown in FIG. 21 are used for spatial distribution control, the resulting porosity and permeability models shown in FIGS. 24A and 24B can be attained.

Figure 24A:
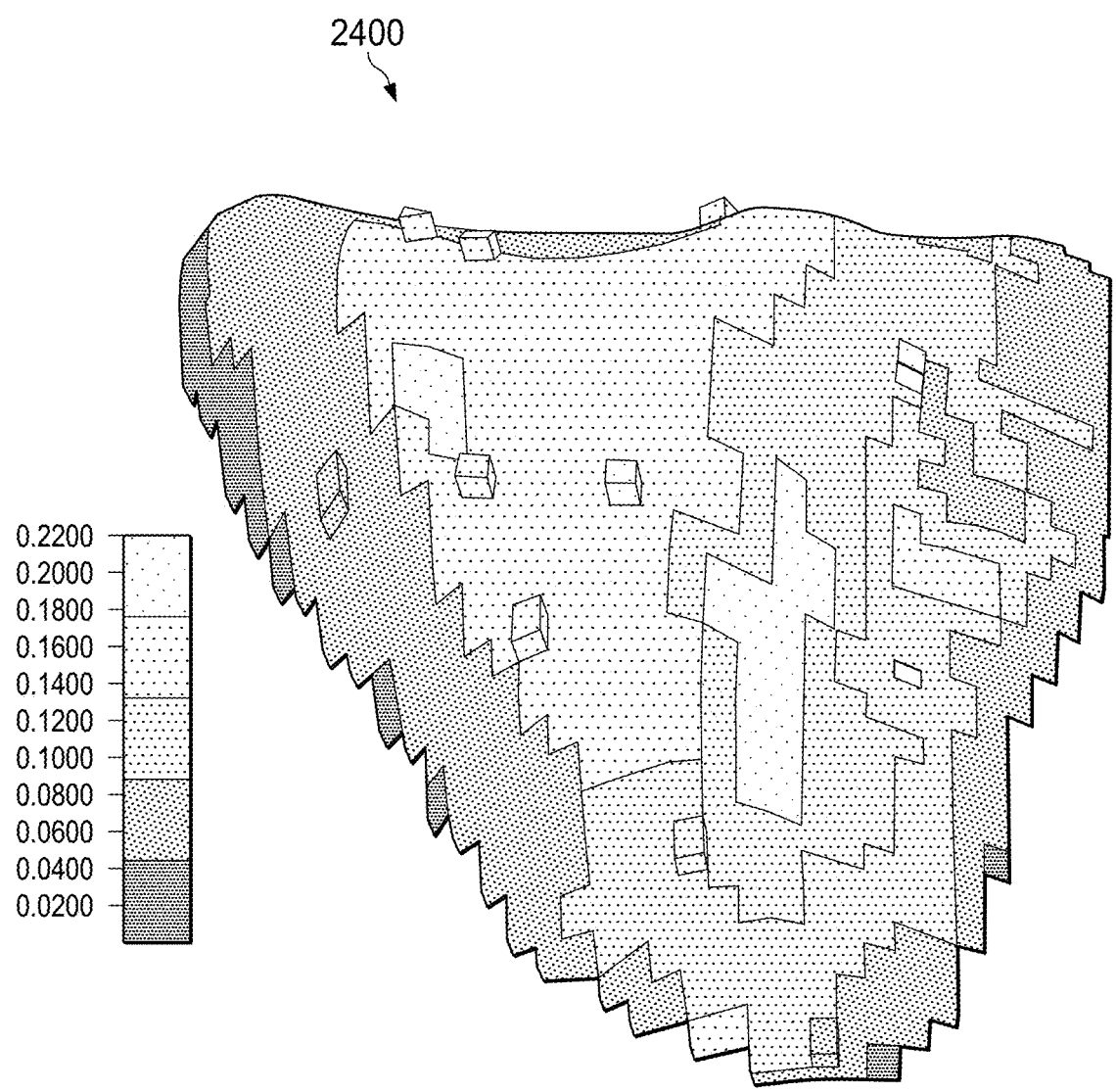
FIG. 24A is an example of a plot showing a porosity model for a hypothetical reservoir, according to some implementations of the present disclosure.
Figure 24B:
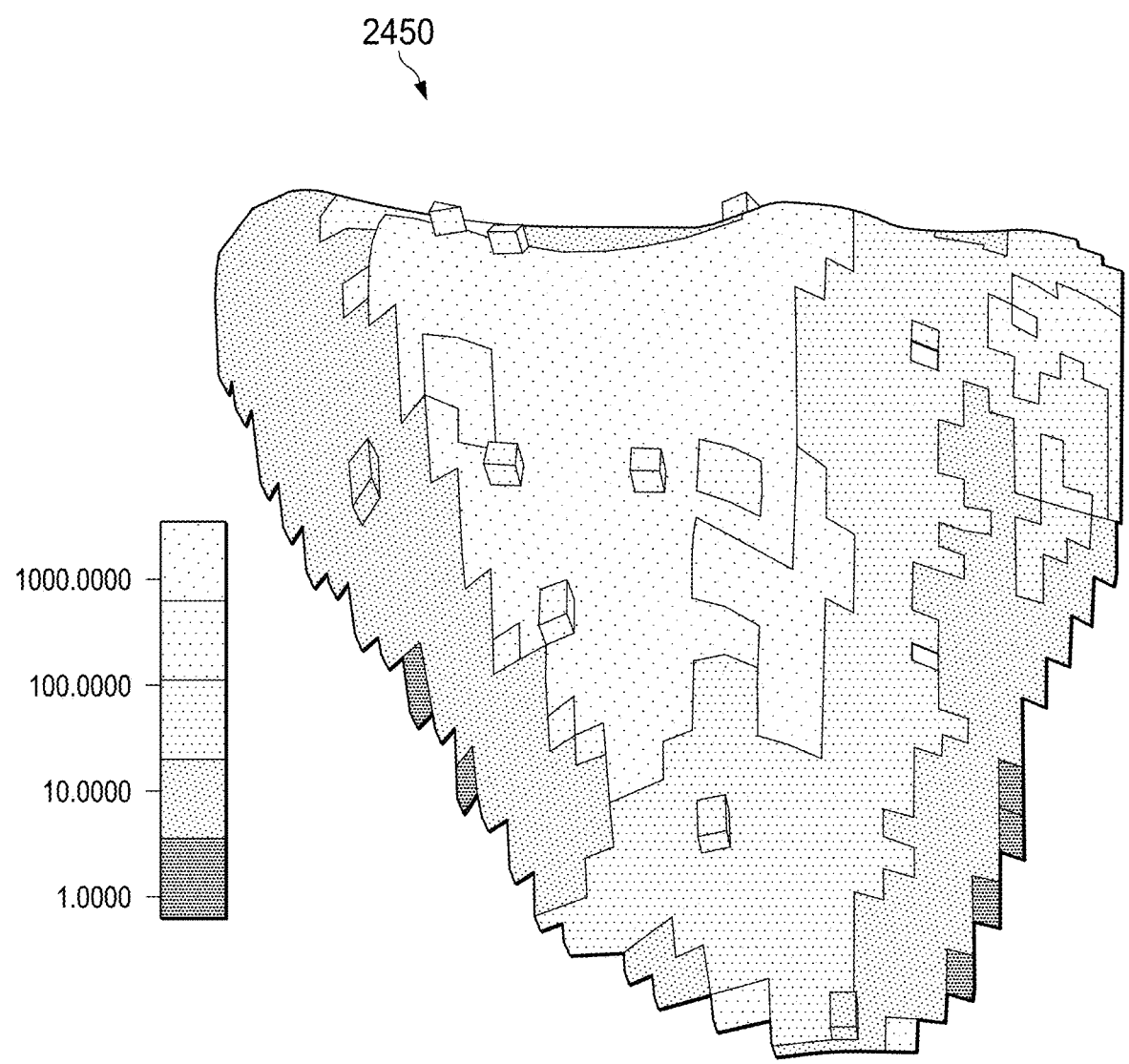
FIG. 24B is an example of a plot showing a permeability model of a hypothetical reservoir, according to some implementations of the present disclosure.

FIG. 24A is an example of a plot showing a porosity model 2400 for a hypothetical reservoir, according to some implementations of the present disclosure. FIG. 24B is an example of a plot showing a permeability model 2450 of a hypothetical reservoir, according to some implementations of the present disclosure. The models 2400 and 2450 are 3D geological models using hypothetical cored wells and derived CRR regions for spatial distribution control. As shown from FIGS. 24A and 24B, the porosity and permeability models 2400 and 2450 are more representative of reality (FIGS. 15A and 15B) than the models based on SGS (FIGS. 23A and 23B). Using the model of the first scenario shown in FIGS. 10A and 10B, if wells were shut-in for 2 hours before recording the single-point datum pressures, then the three static pressure clusters are identifiable as shown in FIG. 25.

Figure 25:
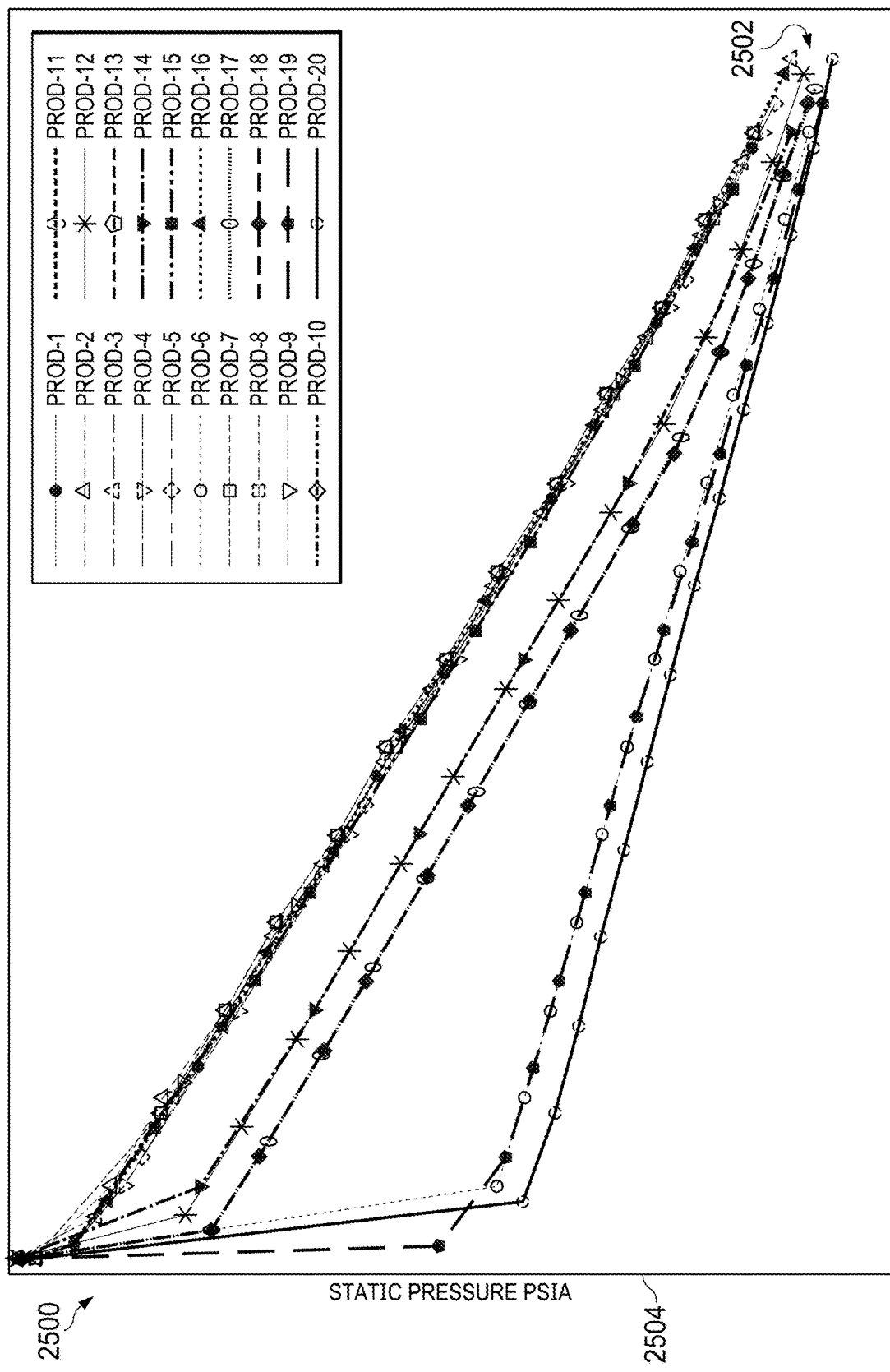
FIG. 25 is a graph showing an example of diagnostic plots including single point static pressures taken after a two-hour shut-in, according to some implementations of the present disclosure.
Figure 26:
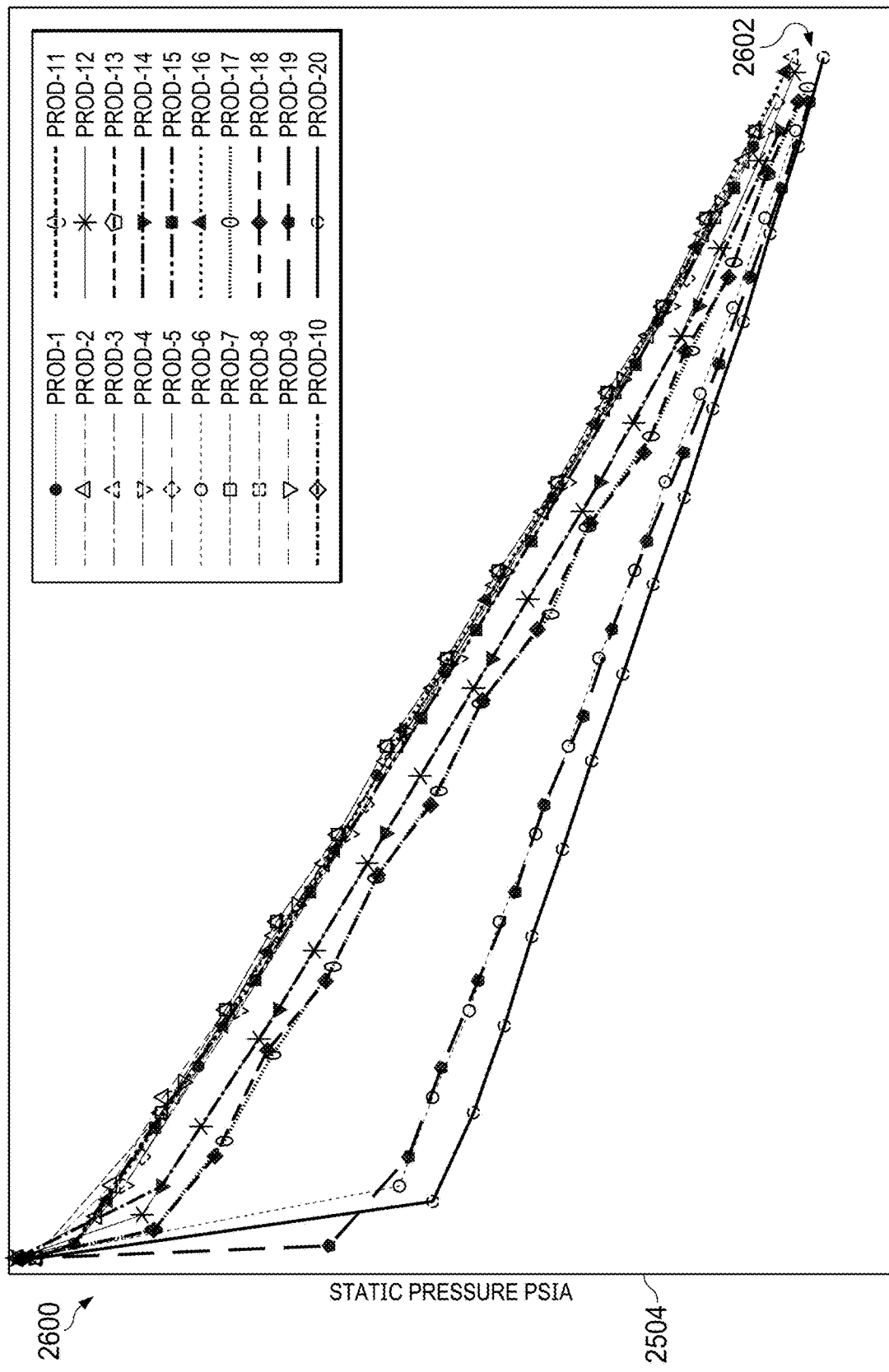
FIG. 26 is a graph showing an example of diagnostic plots including single point static pressures taken after a two-day shut-in, according to some implementations of the present disclosure.
Figure 27:
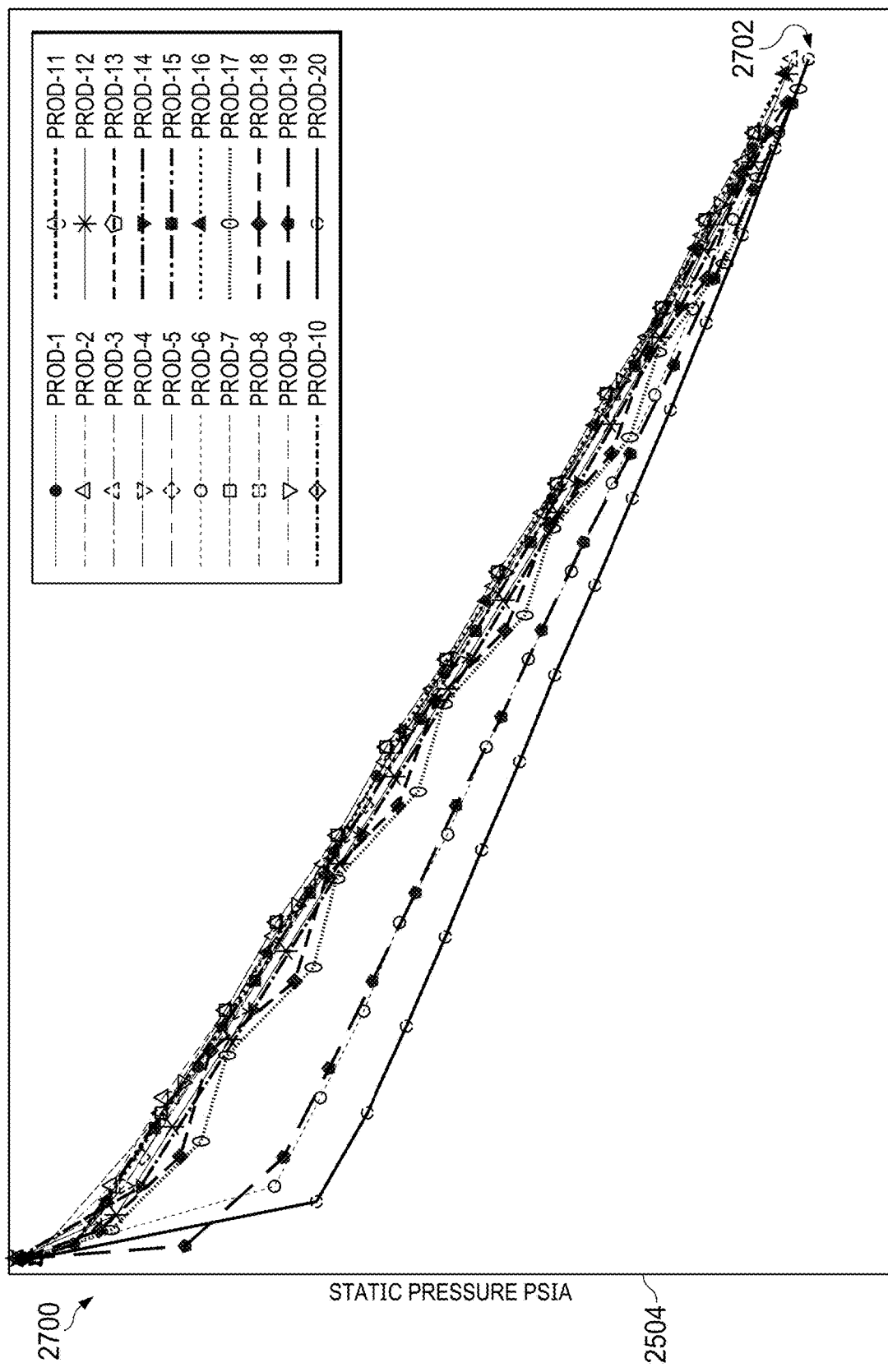
FIG. 27 is a graph showing an example of diagnostic plots including single point static pressures taken after a ten-hour shut-in, according to some implementations of the present disclosure.

FIG. 25 is a graph 2500 showing an example of diagnostic plots 2502 including single point static pressures taken after a two-hour shut-in, according to some implementations of the present disclosure. FIG. 26 is a graph 2600 showing an example of diagnostic plots 2602 including single point static pressures taken after a two-day shut-in, according to some implementations of the present disclosure. FIG. 27 is a graph 2700 showing an example of diagnostic plots 2702 including single point static pressures taken after a ten-hour shut-in, according to some implementations of the present disclosure. The graphs 2500, 2600, and 2700 are plotted relative to a static pressure 2504 and a time 2506.

If the wells were instead shut in for five days before recording each single-point pressure, then only two main clusters would be identifiable. A shut-in period of two days is enough in this case for the two closest heterogeneities to become difficult to distinguish based on single-point datum pressure, as shown in FIG. 26. Finally, if each single point pressure is taken after five-days shut-in, there would be no differentiation of single-point time-lapse shut in pressure between two of the three groups. Also, the third group would also almost collapse into the other two groups to form a single indistinguishable cluster as shown in FIG. 27.

It is evident that when pressures build-up to stabilization before single-point pressures are taken, delineation of heterogeneities using pressure trend becomes challenging. Techniques of the present disclosure can overcome this limitation by using continuous pressure data during a simultaneous field shut-in. This can allow detailed heterogeneities to be identified at an early time, before the whole system homogenizes at late time as shown in FIG. 11. In this example, within the first ten hours, three clusters are evident, but later only two clusters are evident. After about 50 hours (approximately two days), no more distinction can be made between the groups. Also, as shown in FIG. 18, within the first four hours, the clusters are clearly evident, but subsequently all the wells homogenize as ten hours of shut-in is approached.

FIG. 28 is a flowchart of an example of a method 2800 for determining homogeneous regions for geological modeling, according to some implementations of the present disclosure. Method 2800 can be used, for example, to implement the techniques of the present disclosure and to generate results corresponding to FIGS. 1-27.

At 2802, producing wells are equipped with downhill pressure gauges. At 2804, a forced or a planned field shut-down is initiated. At 2806, pressures that are recorded by the down-hole pressure gauges are downloaded.

At 2808, for a pre-defined shut-in period, a scaled rate of change in pressure (for example, 1/q*dP/dt) is plotted versus time on a same axis for all wells. As an example, plots as described with reference to FIG. 18 can be determined.

At 2810, main clusters of the wells are identified, and the wells are located within each cluster on the reservoir's cluster map. For example, based on the plots, specific wells having similar scaled rates of changes in pressure can be clustered.

At 2812, a closed polygon is drawn around the locations of the wells in each cluster. For example, connected reservoir regions 2102, 2104, and 2106 showing boundaries of main permeability heterogeneities (and the wells that are included) can be determined.

At 2814, derived polygons for geological modeling are applied. For example, geological modes can be updated. During geological modeling, input data obtained from wells (core and log data) and an assumption for continuous spatial distribution of these discrete well data are used. Pure statistical distributions, such as Sequential Gaussian Simulation, can be used in the absence of any spatial trend control map. Traditional spatial trend control maps used in the industry include facies and seismic. The output 2814 is another spatial trend control map that can be used to complement traditional facies and seismic maps.

Figure 29:
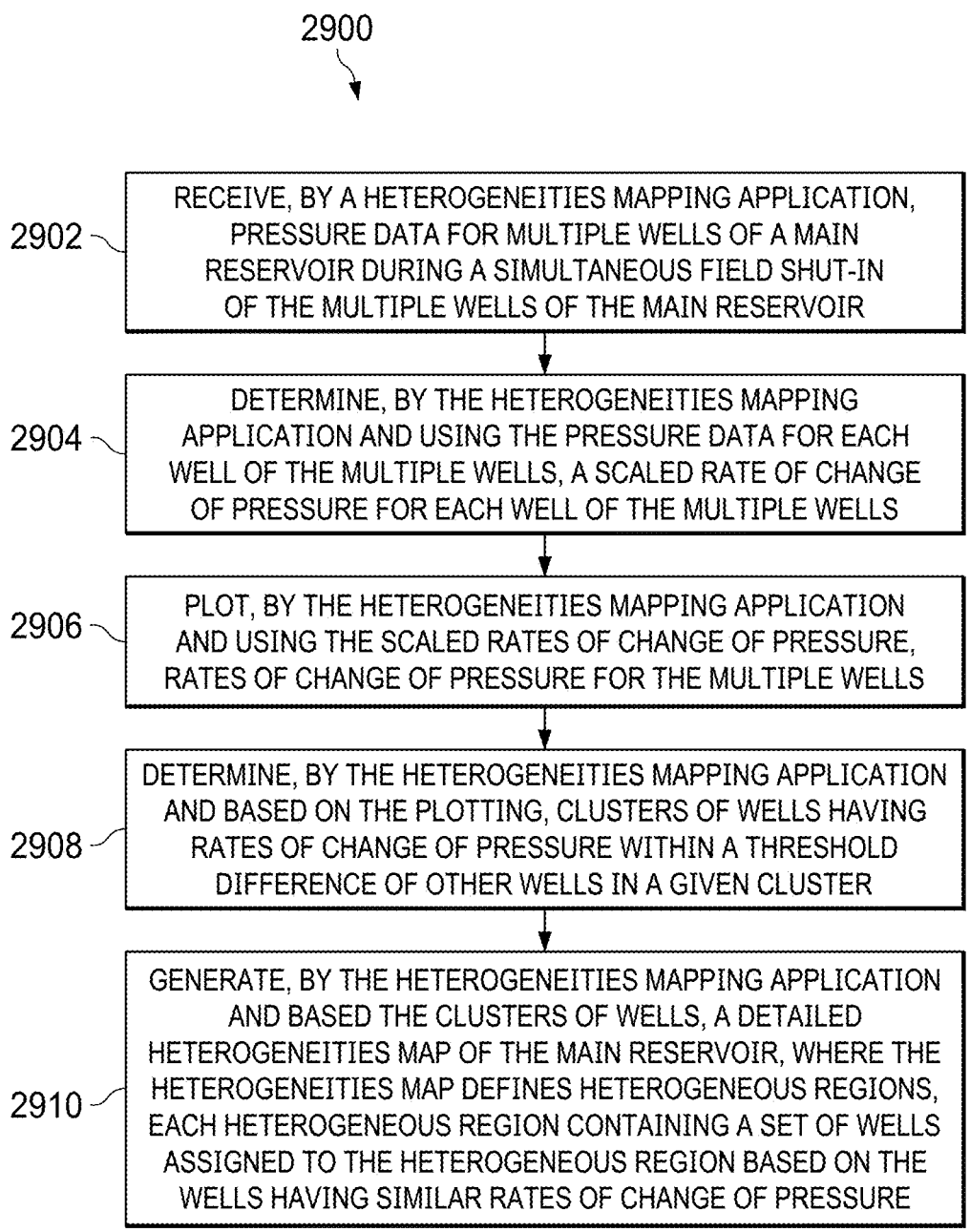
FIG. 29 is a flowchart of an example of a method for receiving continuous pressure data during a simultaneous field shut-in of multiple wells of a main reservoir, and using the data to create a detailed heterogeneities map of the main reservoir, according to some implementations of the present disclosure.

FIG. 29 is a flowchart of an example of a method 2900 for receiving continuous pressure data during a simultaneous field shut-in of multiple wells of a main reservoir, and using the data to create a detailed heterogeneities map of the main reservoir, according to some implementations of the present disclosure. For clarity of presentation, the description that follows generally describes method 2900 in the context of the other figures in this description. However, it will be understood that method 2900 can be performed, for example, by any suitable system, environment, software, and hardware, or a combination of systems, environments, software, and hardware, as appropriate. In some implementations, various steps of method 2900 can be run in parallel, in combination, in loops, or in any order.

At 2902, pressure data for multiple wells of a main reservoir is received by a heterogeneities mapping application during a simultaneous field shut-in of the multiple wells of the main reservoir. For example, the pressure data can be received continuously, such as intervals of every seconds. Since a derivative of the continuous data is generated, if the data points are too far away, then the calculated derivative may be suspect. From 2902, method 2900 proceeds to 2904.

At 2904, a scaled rate of change of pressure for each well of the multiple wells is determined by the heterogeneities mapping application using the pressure data for each well of the multiple wells. The purpose of the scaling can include accounting for the size or production rate of each well. In some implementations, the scaled rate of change of pressure can be given by 1/q*dP/dt, as plotted versus elapsed time, where q is a pre-shut-in flow-rate of the well, dP is a change of pressure P, and dt is a change in time. From 2904, method 2900 proceeds to 2906.

At 2906, rates of change of pressure for the multiple wells are plotted by the heterogeneities mapping application using the scaled rates of change of pressure. For example, plots as described with reference to FIG. 18 can be determined. From 2906, method 2900 proceeds to 2908.

At 2908, clusters of wells having rates of change of pressure within a threshold difference of other wells in a given cluster are determined by the heterogeneities mapping application based on the plotting. For example, determining the clusters of wells can include executing machine learning to group the multiple wells into a number of clusters minimizing differences within each cluster. Based on the plots, specific wells having similar scaled rates of changes in pressure can be clustered, such as the clusters identified in FIG. 18. From 2908, method 2900 proceeds to 2910.

At 2910, a detailed heterogeneities map of the main reservoir is generated by the heterogeneities mapping application based the clusters of wells. The heterogeneities map defines heterogeneous regions. Each heterogeneous region contains a set of wells assigned to the heterogeneous region based on the wells having similar rates of change of pressure. For example, connected reservoir regions 2102, 2104, and 2106 showing boundaries of main permeability heterogeneities (and the wells that are included) can be determined. The purpose of the heterogeneity map can include improving geological modeling, for example, using a control trend map for continuous spatial distribution of discrete well data. After 2910, method 2900 can stop.

In some implementations, method 2900 further includes steps for setting up the main reservoir for the techniques of the present disclosure. For example, producing wells can be equipped with downhill pressure gauges that can be monitored by computer systems and/or equipment at surface. A forced or a planned field shut-down can be initiated, such as by command using production control platform at the surface. At 2806, pressures that are recorded by the down-hole pressure gauges can be downloaded, such as sent to computer applications executing at the surface or sent to a server accessible through the Internet and/or other networks.

In some implementations, method 2900 further includes providing, in a graphical user interface (GUI), a visual identification of wells that have similar behavior on the diagnostic plot, such as in FIG. 21. The GUI can shows individual clusters and can annotate wells in each cluster using a color coding of each well location based on the cluster to which the well belongs. Once the clusters are displayed, an indication can be received of a user selection of a control to create a map. A polygon can be created around each cluster using a polygon placement algorithm. The polygon can be stored in a map accessible by a geo-modeler. The polygon placement algorithm can include, for example, running a polygon boundary line through a midway-point between two well location so of wells in different clusters, for example, as shown in FIG. 21.

Figure 30:
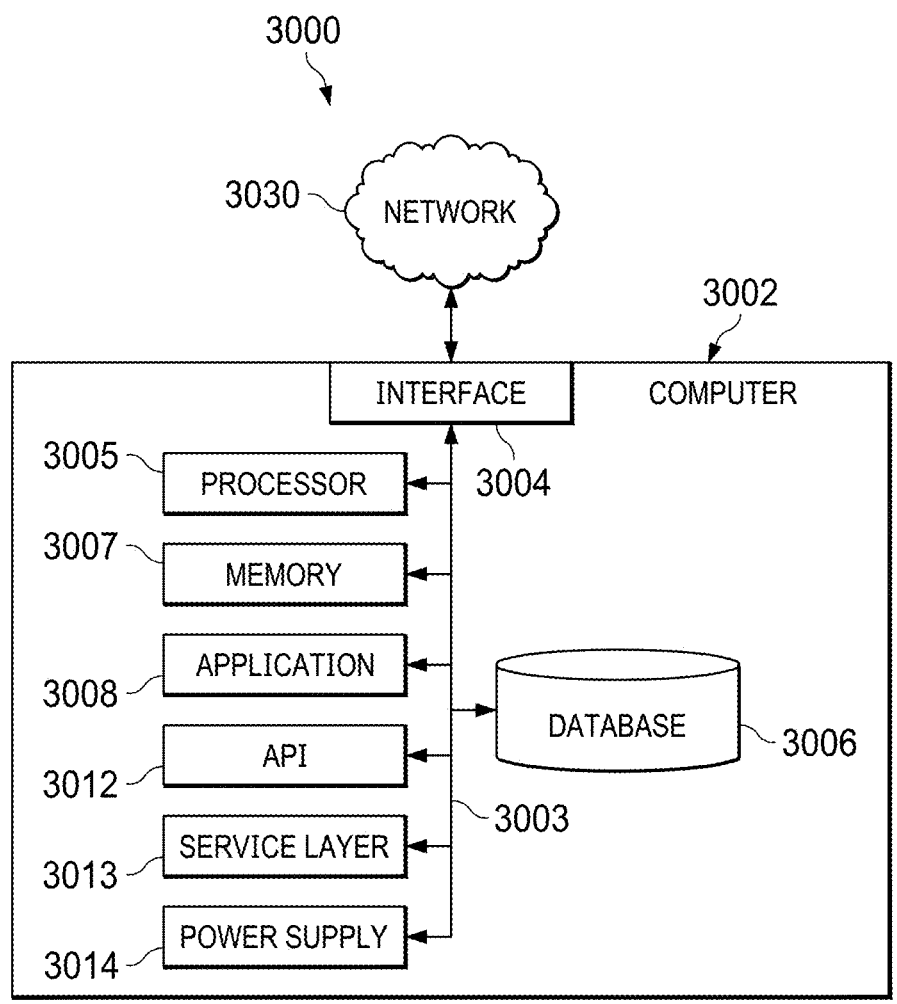
FIG. 30 is a block diagram illustrating an example computer system used to provide computational functionalities associated with described algorithms, methods, functions, processes, flows, and procedures as described in the present disclosure, according to some implementations of the present disclosure.

FIG. 30 is a block diagram of an example computer system 3000 used to provide computational functionalities associated with described algorithms, methods, functions, processes, flows, and procedures described in the present disclosure, according to some implementations of the present disclosure. The illustrated computer 3002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 3002 can include input devices such as keypads, keyboards, and touch screens that can accept user information. Also, the computer 3002 can include output devices that can convey information associated with the operation of the computer 3002. The information can include digital data, visual data, audio information, or a combination of information. The information can be presented in a graphical user interface (UI) (or GUI).

The computer 3002 can serve in a role as a client, a network component, a server, a database, a persistency, or components of a computer system for performing the subject matter described in the present disclosure. The illustrated computer 3002 is communicably coupled with a network 3030. In some implementations, one or more components of the computer 3002 can be configured to operate within different environments, including cloud-computing-based environments, local environments, global environments, and combinations of environments.

At a top level, the computer 3002 is an electronic computing device operable to receive, transmit, process, store, and manage data and information associated with the described subject matter. According to some implementations, the computer 3002 can also include, or be communicably coupled with, an application server, an email server, a web server, a caching server, a streaming data server, or a combination of servers.

The computer 3002 can receive requests over network 3030 from a client application (for example, executing on another computer 3002). The computer 3002 can respond to the received requests by processing the received requests using software applications. Requests can also be sent to the computer 3002 from internal users (for example, from a command console), external (or third) parties, automated applications, entities, individuals, systems, and computers.

Each of the components of the computer 3002 can communicate using a system bus 3003. In some implementations, any or all of the components of the computer 3002, including hardware or software components, can interface with each other or the interface 3004 (or a combination of both) over the system bus 3003. Interfaces can use an application programming interface (API) 3012, a service layer 3013, or a combination of the API 3012 and service layer 3013. The API 3012 can include specifications for routines, data structures, and object classes. The API 3012 can be either computer-language independent or dependent. The API 3012 can refer to a complete interface, a single function, or a set of APIs.

The service layer 3013 can provide software services to the computer 3002 and other components (whether illustrated or not) that are communicably coupled to the computer 3002. The functionality of the computer 3002 can be accessible for all service consumers using this service layer. Software services, such as those provided by the service layer 3013, can provide reusable, defined functionalities through a defined interface. For example, the interface can be software written in JAVA, C++, or a language providing data in extensible markup language (XML) format. While illustrated as an integrated component of the computer 3002, in alternative implementations, the API 3012 or the service layer 3013 can be stand-alone components in relation to other components of the computer 3002 and other components communicably coupled to the computer 3002. Moreover, any or all parts of the API 3012 or the service layer 3013 can be implemented as child or sub-modules of another software module, enterprise application, or hardware module without departing from the scope of the present disclosure.

The computer 3002 includes an interface 3004. Although illustrated as a single interface 3004 in FIG. 30, two or more interfaces 3004 can be used according to particular needs, desires, or particular implementations of the computer 3002 and the described functionality. The interface 3004 can be used by the computer 3002 for communicating with other systems that are connected to the network 3030 (whether illustrated or not) in a distributed environment. Generally, the interface 3004 can include, or be implemented using, logic encoded in software or hardware (or a combination of software and hardware) operable to communicate with the network 3030. More specifically, the interface 3004 can include software supporting one or more communication protocols associated with communications. As such, the network 3030 or the interface's hardware can be operable to communicate physical signals within and outside of the illustrated computer 3002.

The computer 3002 includes a processor 3005. Although illustrated as a single processor 3005 in FIG. 30, two or more processors 3005 can be used according to particular needs, desires, or particular implementations of the computer 3002 and the described functionality. Generally, the processor 3005 can execute instructions and can manipulate data to perform the operations of the computer 3002, including operations using algorithms, methods, functions, processes, flows, and procedures as described in the present disclosure.

The computer 3002 also includes a database 3006 that can hold data for the computer 3002 and other components connected to the network 3030 (whether illustrated or not). For example, database 3006 can be an in-memory, conventional, or a database storing data consistent with the present disclosure. In some implementations, database 3006 can be a combination of two or more different database types (for example, hybrid in-memory and conventional databases) according to particular needs, desires, or particular implementations of the computer 3002 and the described functionality. Although illustrated as a single database 3006 in FIG. 30, two or more databases (of the same, different, or combination of types) can be used according to particular needs, desires, or particular implementations of the computer 3002 and the described functionality. While database 3006 is illustrated as an internal component of the computer 3002, in alternative implementations, database 3006 can be external to the computer 3002.

The computer 3002 also includes a memory 3007 that can hold data for the computer 3002 or a combination of components connected to the network 3030 (whether illustrated or not). Memory 3007 can store any data consistent with the present disclosure. In some implementations, memory 3007 can be a combination of two or more different types of memory (for example, a combination of semiconductor and magnetic storage) according to particular needs, desires, or particular implementations of the computer 3002 and the described functionality. Although illustrated as a single memory 3007 in FIG. 30, two or more memories 3007 (of the same, different, or combination of types) can be used according to particular needs, desires, or particular implementations of the computer 3002 and the described functionality. While memory 3007 is illustrated as an internal component of the computer 3002, in alternative implementations, memory 3007 can be external to the computer 3002.

The application 3008 can be an algorithmic software engine providing functionality according to particular needs, desires, or particular implementations of the computer 3002 and the described functionality. For example, application 3008 can serve as one or more components, modules, or applications. Further, although illustrated as a single application 3008, the application 3008 can be implemented as multiple applications 3008 on the computer 3002. In addition, although illustrated as internal to the computer 3002, in alternative implementations, the application 3008 can be external to the computer 3002.

The computer 3002 can also include a power supply 3014. The power supply 3014 can include a rechargeable or non-rechargeable battery that can be configured to be either user- or non-user-replaceable. In some implementations, the power supply 3014 can include power-conversion and management circuits, including recharging, standby, and power management functionalities. In some implementations, the power-supply 3014 can include a power plug to allow the computer 3002 to be plugged into a wall socket or a power source to, for example, power the computer 3002 or recharge a rechargeable battery.

There can be any number of computers 3002 associated with, or external to, a computer system containing computer 3002, with each computer 3002 communicating over network 3030. Further, the terms "client," "user," and other appropriate terminology can be used interchangeably, as appropriate, without departing from the scope of the present disclosure. Moreover, the present disclosure contemplates that many users can use one computer 3002 and one user can use multiple computers 3002.

Described implementations of the subject matter can include one or more features, alone or in combination.

For example, in a first implementation, a computer-implemented method includes the following. Pressure data for multiple wells of a main reservoir is received by a heterogeneities mapping application during a simultaneous field shut-in of the multiple wells of the main reservoir. A scaled rate of change of pressure for each well of the multiple wells is determined by the heterogeneities mapping application using the pressure data for each well of the multiple wells. Rates of change of pressure for the multiple wells are plotted by the heterogeneities mapping application using the scaled rates of change of pressure. Clusters of wells having rates of change of pressure within a threshold difference of other wells in a given cluster are determined by the heterogeneities mapping application based on the plotting. A detailed heterogeneities map of the main reservoir is generated by the heterogeneities mapping application based the clusters of wells. The heterogeneities map defines heterogeneous regions. Each heterogeneous region contains a set of wells assigned to the heterogeneous region based on the wells having similar rates of change of pressure.

The foregoing and other described implementations can each, optionally, include one or more of the following features:

A first feature, combinable with any of the following features, where the scaled rate of change of pressure is given by $1/q*dP/dt$ as plotted versus elapsed time, and where q is a pre-shut-in flow-rate of a well, dP is a change of pressure P, and dt is a change in time.

A second feature, combinable with any of the previous or following features, where determining the clusters of wells includes executing machine learning to group the multiple wells into a number of clusters minimizing differences within each cluster.

A third feature, combinable with any of the previous or following features, the method further including: providing, in a graphical user interface (GUI), a visual identification of wells that have similar behavior on the diagnostic plot.

A fourth feature, combinable with any of the previous or following features, where the GUI shows individual clusters and annotates wells in each cluster using a color coding of each well location based on the cluster to which the well belongs.

A fifth feature, combinable with any of the previous or following features, the method further including: receiving an indication of a user selection of a control to create a map; creating a polygon around each cluster using a polygon placement algorithm; and storing the polygon in a map accessible by a geo-modeler.

A sixth feature, combinable with any of the previous or following features, where the polygon placement algorithm includes running a polygon boundary line through a midway-point between two well location so of wells in different clusters.

In a second implementation, a non-transitory, computer-readable medium stores one or more instructions executable by a computer system to perform operations including the following. Pressure data for multiple wells of a main reservoir is received by a heterogeneities mapping application during a simultaneous field shut-in of the multiple wells of the main reservoir. A scaled rate of change of pressure for each well of the multiple wells is determined by the heterogeneities mapping application using the pressure data for each well of the multiple wells. Rates of change of pressure for the multiple wells are plotted by the heterogeneities mapping application using the scaled rates of change of pressure. Clusters of wells having rates of change of pressure within a threshold difference of other wells in a given cluster are determined by the heterogeneities mapping application based on the plotting. A detailed heterogeneities map of the main reservoir is generated by the heterogeneities mapping application based the clusters of wells. The heterogeneities map defines heterogeneous regions. Each heterogeneous region contains a set of wells assigned to the heterogeneous region based on the wells having similar rates of change of pressure.

The foregoing and other described implementations can each, optionally, include one or more of the following features:

A first feature, combinable with any of the following features, where the scaled rate of change of pressure is given by $1/q*dP/dt$ as plotted versus elapsed time, and where q is a pre-shut-in flow-rate of a well, dP is a change of pressure P, and dt is a change in time.

A second feature, combinable with any of the previous or following features, where determining the clusters of wells includes executing machine learning to group the multiple wells into a number of clusters minimizing differences within each cluster.

A third feature, combinable with any of the previous or following features, the operations further including: providing, in a graphical user interface (GUI), a visual identification of wells that have similar behavior on the diagnostic plot.

A fourth feature, combinable with any of the previous or following features, where the GUI shows individual clusters and annotates wells in each cluster using a color coding of each well location based on the cluster to which the well belongs.

A fifth feature, combinable with any of the previous or following features, the operations further including: receiving an indication of a user selection of a control to create a map; creating a polygon around each cluster using a polygon placement algorithm; and storing the polygon in a map accessible by a geo-modeler.

A sixth feature, combinable with any of the previous or following features, where the polygon placement algorithm includes running a polygon boundary line through a midway-point between two well location so of wells in different clusters.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Pressure data for multiple wells of a main reservoir is received by a heterogeneities mapping application during a simultaneous field shut-in of the multiple wells of the main reservoir. A scaled rate of change of pressure for each well of the multiple wells is determined by the heterogeneities mapping application using the pressure data for each well of the multiple wells. Rates of change of pressure for the multiple wells are plotted by the heterogeneities mapping application using the scaled rates of change of pressure. Clusters of wells having rates of change of pressure within a threshold difference of other wells in a given cluster are determined by the heterogeneities mapping application based on the plotting. A detailed heterogeneities map of the main reservoir is generated by the heterogeneities mapping application based the clusters of wells. The heterogeneities map defines heterogeneous regions. Each heterogeneous region contains a set of wells assigned to the heterogeneous region based on the wells having similar rates of change of pressure.

The foregoing and other described implementations can each, optionally, include one or more of the following features:

A first feature, combinable with any of the following features, where the scaled rate of change of pressure is given by 1/q*dP/dt as plotted versus elapsed time, and where q is a pre-shut-in flow-rate of a well, dP is a change of pressure P, and dt is a change in time.

A second feature, combinable with any of the previous or following features, where determining the clusters of wells includes executing machine learning to group the multiple wells into a number of clusters minimizing differences within each cluster.

A third feature, combinable with any of the previous or following features, the operations further including: providing, in a graphical user interface (GUI), a visual identification of wells that have similar behavior on the diagnostic plot.

A fourth feature, combinable with any of the previous or following features, where the GUI shows individual clusters and annotates wells in each cluster using a color coding of each well location based on the cluster to which the well belongs.

A fifth feature, combinable with any of the previous or following features, the operations further including: receiving an indication of a user selection of a control to create a map; creating a polygon around each cluster using a polygon placement algorithm; and storing the polygon in a map accessible by a geo-modeler.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    monitoring, by a heterogeneities mapping application executed by surface equipment providing production control of multiple wells that are producing in a main reservoir, downhill pressure gauges of the multiple wells;
    initiating, by the heterogeneities mapping application subsequent to the monitoring, a command for a simultaneous field shut-in of the multiple wells;
    receiving, by the heterogeneities mapping application through a network from down-hole pressure gauges, pressure data for the multiple wells of the main reservoir during the simultaneous field shut-in of the multiple wells of the main reservoir;
    determining, by the heterogeneities mapping application during the simultaneous field shut-in of the multiple wells and using the pressure data for each well of the multiple wells, a scaled rate of change of pressure for each well of the multiple wells;
    plotting, by the heterogeneities mapping application and using the scaled rates of change of pressure, a diagnostic plot including rates of change of pressure for the multiple wells;
    determining, by the heterogeneities mapping application and based on the plotting, clusters of wells having rates of change of pressure within a threshold difference of other wells in a given cluster;
    generating, by the heterogeneities mapping application and based on the clusters of wells, a detailed heterogeneities map of the main reservoir, wherein the detailed heterogeneities map defines heterogeneous regions, each heterogeneous region containing a set of wells assigned to the heterogeneous region based on the wells having similar rates of change of pressure;
    providing, by the heterogeneities mapping application for display at the surface equipment, the detailed heterogeneities map of the main reservoir; and
    building, by the heterogeneities mapping application and using at least the detailed heterogeneities map of the main reservoir and core and log data obtained during production of the main reservoir, a geological model of the main reservoir.

2. The computer-implemented method of claim 1, wherein the scaled rate of change of pressure is given by $1/q*dP/dt$ as plotted versus elapsed time, and wherein q is a pre-shut-in flow-rate of a well, dP is a change of pressure P, and dt is a change in time.

3. The computer-implemented method of claim 1, wherein determining the clusters of wells comprises executing machine learning to group the multiple wells into a number of clusters minimizing differences within each cluster.

4. The computer-implemented method of claim 1, further comprising:
    providing, in a graphical user interface (GUI), a visual identification of wells that have similar behavior on the diagnostic plot.

5. The computer-implemented method of claim 4, wherein the GUI shows individual clusters and annotates wells in each cluster using a color coding of each well location based on the cluster to which the well belongs.

6. The computer-implemented method of claim 5, further comprising
    receiving an indication of a user selection of a control to create a map;
    creating a polygon around each cluster using a polygon placement algorithm; and
    storing the polygon in a map accessible by a geo-modeler.

7. The computer-implemented method of claim 6, wherein the polygon placement algorithm includes running a polygon boundary line through a midway-point between two well locations of wells in different clusters.

8. A non-transitory, computer-readable medium storing one or more instructions executable by a computer system to perform operations comprising:
    monitoring, by a heterogeneities mapping application executed by surface equipment providing production control of multiple wells that are producing in a main reservoir, downhill pressure gauges of the multiple wells;
    initiating, by the heterogeneities mapping application subsequent to the monitoring, a command for a simultaneous field shut-in of the multiple wells;
    receiving, by the heterogeneities mapping application through a network from down-hole pressure gauges, pressure data for the multiple wells of the main reservoir during the simultaneous field shut-in of the multiple wells of the main reservoir;

determining, by the heterogeneities mapping application during the simultaneous field shut-in of the multiple wells and using the pressure data for each well of the multiple wells, a scaled rate of change of pressure for each well of the multiple wells;

plotting, by the heterogeneities mapping application and using the scaled rates of change of pressure, a diagnostic plot including rates of change of pressure for the multiple wells;

determining, by the heterogeneities mapping application and based on the plotting, clusters of wells having rates of change of pressure within a threshold difference of other wells in a given cluster;

generating, by the heterogeneities mapping application and based on the clusters of wells, a detailed heterogeneities map of the main reservoir, wherein the detailed heterogeneities map defines heterogeneous regions, each heterogeneous region containing a set of wells assigned to the heterogeneous region based on the wells having similar rates of change of pressure;

providing, by the heterogeneities mapping application for display at the surface equipment, the detailed heterogeneities map of the main reservoir; and building, by the heterogeneities mapping application and using at least the detailed heterogeneities map of the main reservoir and core and log data obtained during production of the main reservoir, a geological model of the main reservoir.

9. The non-transitory, computer-readable medium of claim 8, wherein the scaled rate of change of pressure is given by 1/q*dP/dt as plotted versus elapsed time, and wherein q is a pre-shut-in flow-rate of a well, dP is a change of pressure P, and dt is a change in time.

10. The non-transitory, computer-readable medium of claim 8, wherein determining the clusters of wells comprises executing machine learning to group the multiple wells into a number of clusters minimizing differences within each cluster.

11. The non-transitory, computer-readable medium of claim 8, the operations further comprising:
providing, in a graphical user interface (GUI), a visual identification of wells that have similar behavior on the diagnostic plot.

12. The non-transitory, computer-readable medium of claim 11, wherein the GUI shows individual clusters and annotates wells in each cluster using a color coding of each well location based on the cluster to which the well belongs.

13. The non-transitory, computer-readable medium of claim 12, the operations further comprising
receiving an indication of a user selection of a control to create a map;
creating a polygon around each cluster using a polygon placement algorithm; and
storing the polygon in a map accessible by a geo-modeler.

14. The non-transitory, computer-readable medium of claim 13, wherein the polygon placement algorithm includes running a polygon boundary line through a midway-point between two well locations of wells in different clusters.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

monitoring, by a heterogeneities mapping application executed by surface equipment providing production control of multiple wells that are producing in a main reservoir, downhill pressure gauges of the multiple wells;

initiating, by the heterogeneities mapping application subsequent to the monitoring, a command for a simultaneous field shut-in of the multiple wells;

receiving, by the heterogeneities mapping application through a network from down-hole pressure gauges, pressure data for the multiple wells of the main reservoir during the simultaneous field shut-in of the multiple wells of the main reservoir;

determining, by the heterogeneities mapping application during the simultaneous field shut-in of the multiple wells and using the pressure data for each well of the multiple wells, a scaled rate of change of pressure for each well of the multiple wells;

plotting, by the heterogeneities mapping application and using the scaled rates of change of pressure, a diagnostic plot including rates of change of pressure for the multiple wells;

determining, by the heterogeneities mapping application and based on the plotting, clusters of wells having rates of change of pressure within a threshold difference of other wells in a given cluster;

generating, by the heterogeneities mapping application and based on the clusters of wells, a detailed heterogeneities map of the main reservoir, wherein the detailed heterogeneities map defines heterogeneous regions, each heterogeneous region containing a set of wells assigned to the heterogeneous region based on the wells having similar rates of change of pressure;

providing, by the heterogeneities mapping application for display at the surface equipment, the detailed heterogeneities map of the main reservoir; and building, by the heterogeneities mapping application and using at least the detailed heterogeneities map of the main reservoir and core and log data obtained during production of the main reservoir, a geological model of the main reservoir.

16. The computer-implemented system of claim 15, wherein the scaled rate of change of pressure is given by 1/q*dP/dt as plotted versus elapsed time, and wherein q is a pre-shut-in flow-rate of a well, dP is a change of pressure P, and dt is a change in time.

17. The computer-implemented system of claim 15, wherein determining the clusters of wells comprises executing machine learning to group the multiple wells into a number of clusters minimizing differences within each cluster.

18. The computer-implemented system of claim 15, the operations further comprising:
providing, in a graphical user interface (GUI), a visual identification of wells that have similar behavior on the diagnostic plot.

19. The computer-implemented system of claim 18, wherein the GUI shows individual clusters and annotates wells in each cluster using a color coding of each well location based on the cluster to which the well belongs.

20. The computer-implemented system of claim 19, the operations further comprising receiving an indication of a user selection of a control to create a map;
creating a polygon around each cluster using a polygon placement algorithm; and
storing the polygon in a map accessible by a geo-modeler.

\* \* \* \* \*